(12) United States Patent
Tagawa et al.

(10) Patent No.: US 11,988,546 B2
(45) Date of Patent: May 21, 2024

(54) SIEVING DEVICE

(71) Applicant: SATAKE CORPORATION, Tokyo (JP)

(72) Inventors: Sumio Tagawa, Tokyo (JP); Shinpei Nobuto, Tokyo (JP); Shogo Kawano, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 347 days.

(21) Appl. No.: 17/602,632

(22) PCT Filed: Apr. 10, 2020

(86) PCT No.: PCT/JP2020/016146
§ 371 (c)(1),
(2) Date: Oct. 8, 2021

(87) PCT Pub. No.: WO2020/209366
PCT Pub. Date: Oct. 15, 2020

(65) Prior Publication Data
US 2022/0163374 A1    May 26, 2022

(30) Foreign Application Priority Data

Apr. 12, 2019  (JP) .............................. JP2019-076338
Apr. 12, 2019  (JP) .............................. JP2019-076425

(51) Int. Cl.
*B07B 1/00* (2006.01)
*B07B 1/28* (2006.01)
(Continued)

(52) U.S. Cl.
CPC ................. *G01H 1/00* (2013.01); *B07B 1/28* (2013.01); *B07B 1/42* (2013.01); *G01H 17/00* (2013.01); *H02P 29/024* (2013.01)

(58) Field of Classification Search
CPC ........ B07B 1/00; B07B 1/28–44; G01H 1/00; G01H 17/00; H02P 29/024
See application file for complete search history.

(56) References Cited

U.S. PATENT DOCUMENTS 5,804,733 A    9/1998 Kurita et al.
2005/0242003 A1   11/2005 Scott et al.
(Continued)

FOREIGN PATENT DOCUMENTS

CN    1139207 A     1/1997
CN    201302674 Y   9/2009
(Continued)

OTHER PUBLICATIONS

Partial Supplementary European Search Report dated Nov. 29, 2022 in EP Application No. 20787160.9.
(Continued)

*Primary Examiner* — Nguyen Q. Ha
(74) *Attorney, Agent, or Firm* — Faegre Drinker Biddle & Reath LLP

(57) ABSTRACT

A sieving device includes a mount, and a vibration unit configured to perform reciprocating vibration relative to the mount in one direction in plan view and including a sieve frame. The vibration unit includes a first sensor unit and a vibration state measurement unit. The first sensor unit includes a vibration-unit acceleration sensing unit capable of sensing acceleration of the vibration unit, and a vibration-unit angular velocity sensing unit capable of sensing angular velocity of the vibration unit. The vibration state measurement unit measures a vibration state of the vibration unit based on the acceleration and the angular velocity of the vibration unit, which are sensed by the first sensor unit.

13 Claims, 18 Drawing Sheets

(51) Int. Cl.
  *B07B 1/42* (2006.01)
  *G01H 1/00* (2006.01)
  *G01H 17/00* (2006.01)
  *H02P 29/024* (2016.01)

(56) References Cited

U.S. PATENT DOCUMENTS

| | | | |
|---|---|---|---|
| 2005/0242009 A1 | 11/2005 | Padalino et al. | |
| 2006/0016768 A1 | 1/2006 | Grichar et al. | |
| 2009/0000384 A1 | 1/2009 | Kuehl, II | |
| 2009/0248360 A1 | 10/2009 | Garrison | |
| 2011/0210083 A1 | 9/2011 | Scott et al. | |
| 2015/0134271 A1 | 5/2015 | Ikejiri et al. | |
| 2016/0341629 A1* | 11/2016 | Schaefer | G01M 13/028 |
| 2020/0240870 A1 | 7/2020 | Schaefer et al. | |

FOREIGN PATENT DOCUMENTS

| | | |
|---|---|---|
| CN | 101662248 A | 3/2010 |
| CN | 101711189 A | 5/2010 |
| CN | 102075139 A | 5/2011 |
| CN | 102494882 A | 6/2012 |
| CN | 103706562 A | 4/2014 |
| CN | 105478351 A | 4/2016 |
| CN | 105899927 A | 8/2016 |
| CN | 205463146 U | 8/2016 |
| CN | 106556460 A | 4/2017 |
| CN | 107202631 A | 9/2017 |
| CN | 107314878 A | 11/2017 |
| CN | 107812708 A | 3/2018 |
| CN | 108139229 A | 6/2018 |
| JP | S56-56276 A | 5/1981 |
| JP | H06-229818 A | 8/1994 |
| JP | H07-244527 A | 9/1995 |
| JP | H08-39002 A | 2/1996 |
| JP | 2000-249622 A | 9/2000 |
| JP | 2000-288470 A | 10/2000 |
| JP | 2008-161757 A | 7/2008 |
| JP | 2014-184412 A | 10/2014 |
| WO | WO-03/090940 A1 | 11/2003 |
| WO | WO-2009/051576 A1 | 4/2009 |
| WO | WO-2019/072462 A1 | 4/2019 |

OTHER PUBLICATIONS

Chinese Notice of Allowance dated Jan. 28, 2023 in Chinese Application No. 202080028167.2.

* cited by examiner

INSTALLATION ANGLE ABOUT Y AXIS:

POSITIVE WHEN LEFT SIDE OF
SECOND SENSOR UNIT IS HIGHER, OR
NEGATIVE WHEN LEFT SIDE OF
SECOND SENSOR UNIT IS LOWER

INSTALLATION ANGLE ABOUT X AXIS:

POSITIVE WHEN RIGHT SIDE OF SECOND SENSOR UNIT IS HIGHER, OR NEGATIVE WHEN RIGHT SIDE OF SECOND SENSOR UNIT IS LOWER

SIEVING DEVICE

CROSS-REFERENCE TO RELATED APPLICATIONS

This application is a National Stage of International Application No. PCT/JP2020/016146, filed Apr. 10, 2020, and claims the benefit of Japanese Patent Application No. 2019-076338, filed Apr. 12, 2019, and Japanese Patent Application No. 2019-076425, filed Apr. 12, 2019, the entire contents of each of with are incorporated herein by reference.

TECHNICAL FIELD

The present invention relates to a sieving device configured to sieve granular substances depending on their grain diameters by vibration.

BACKGROUND ART

Conventionally, for example, a purifier disclosed in Patent Literature 1 has been known as a device that sieves ground wheat or the like.

In the purifier, four corner parts of a sieve box in which a plurality of sieve meshes having different mesh sizes are disposed are supported by pillars through rubber springs. The sieve box is coupled to a vibration electric motor, and a supply gutter through which stock to be sorted is supplied is coupled to an upper end of the sieve box. In addition, a collection device configured to collect falling stock is installed below the sieve box.

When the vibration electric motor is actuated, the sieve box and the collection device perform reciprocating vibration in a front-back direction, the stock supplied onto the sieve box through the supply gutter is sorted by grain diameter through vibration and collected by the collection device.

CITATION LIST

Patent Literature

[Patent Literature 1] Japanese Patent Laid-open No. 8-39002

SUMMARY OF INVENTION

Technical Problem

A sieving device such as the purifier disclosed in Patent Literature 1 has no function to monitor the vibration state of the sieve box in operation. Thus, the shake angle and shake width of the sieve box have been visually adjusted to appropriate values at installation.

After actuation, whether the shake state is appropriately maintained has been visually inspected by a maintenance staff. Furthermore, the vibration frequency of the sieve box has been set only through the output frequency of a motor inverter.

However, with visual inspection, determination differs among staffs, which causes delay of anomaly handling in some cases, and thus anomaly is overlooked and an accident potentially occurs in a case of degradation of the rubber springs supporting the sieve box or machine failure. In addition, when failure occurs to the vibration electric motor, the stock does not uniformly spread on sieves, which has caused degradation of purification performance.

Furthermore, the vibration frequency of a vibration unit is not measured, and thus the actual vibration frequency is potentially different from a set value, and as a result, sieving performance has not reached a product specification in some cases.

The vibration electric motor suddenly stops when a bearing inside is damaged, and thus danger cannot be detected until such an accident occurs. When an attachment bolt of the vibration electric motor is loosened, vibration is not appropriately transferred to the sieve box, which potentially degrades sieving performance. When looseness occurs in the shaft bush of the vibration electric motor, the lifetime of the electric motor is potentially shortened.

The present invention is intended to provide a sieving device that constantly monitors the vibration state of a vibration unit, can swiftly detect mechanical failure, failure of a vibration electric motor, and the like, and prevents degradation of purification function by sieving. The present invention is also intended to provide a sieving device that constantly monitors the vibration state of a vibration electric motor and can swiftly handle anomaly of the vibration electric motor.

Solution to Problem

An invention according to claim 1 of the present application is a sieving device including a mount, and a vibration unit configured to perform reciprocating vibration relative to the mount in one direction in plan view and including a sieve frame, the sieving device further including a first sensor unit, in the vibration unit, including a vibration-unit acceleration sensing unit capable of sensing acceleration of at least the vibration unit, and a vibration state measurement unit configured to measure a vibration state of the vibration unit based on the acceleration of the vibration unit, which is sensed by the first sensor unit.

An invention according to claim 2 of the present application is the sieving device according to claim 1, in which the first sensor unit includes a vibration-unit angular velocity sensing unit capable of sensing angular velocity of the vibration unit, and the vibration state measurement unit measures the vibration state of the vibration unit based on the angular velocity of the vibration unit, which is sensed by the first sensor unit.

An invention according to claim 3 of the present application is the sieving device according to claim 1 or 2, in which the mount includes a second sensor unit including a mount acceleration sensing unit and a mount angular velocity sensing unit, the mount acceleration sensing unit being capable of sensing acceleration of the mount, the mount angular velocity sensing unit being capable of sensing angular velocity of the mount, and the vibration state measurement unit measures a vibration state of the mount based on the acceleration and the angular velocity of the mount, which are sensed by the second sensor unit.

An invention according to claim 4 of the present application is the sieving device according to claim 2 or 3, in which the vibration state measured by the vibration state measurement unit is a vibration angle.

An invention according to claim 5 of the present application is the sieving device according to claim 1 or 3, in which the vibration state measured by the vibration state measurement unit is displacement.

An invention according to claim 6 of the present application is the sieving device according to claim 5, in which the vibration state measurement unit is capable of measuring displacement at least in a direction orthogonal to the one direction in which the vibration unit performs reciprocating vibration, based on the acceleration sensed by the vibration-unit acceleration sensing unit.

An invention according to claim 7 of the present application is the sieving device according to claim 1, in which the vibration state of the vibration unit measured by the vibration state measurement unit is a vibration frequency in the one direction.

An invention according to claim 8 of the present application is the sieving device according to any one of claims 1 to 7, further including a display device configured to display the vibration state measured by the vibration state measurement unit.

An invention according to claim 9 of the present application is a sieving device including a mount a vibration unit configured to perform reciprocating vibration relative to the mount in one direction in plan view and including a sieve frame, and a vibration electric motor configured to generate the reciprocating vibration of the vibration unit by rotating a rotor inside a casing. The sieving device includes an acceleration sensing unit provided to the casing of the vibration electric motor and capable of sensing acceleration of the vibration electric motor in a radial direction of rotation of the rotor, and a vibration monitoring device configured to monitor the vibration unit and/or the vibration electric motor by measuring a vibration state of the vibration electric motor based on the acceleration of the vibration electric motor, which is sensed by the acceleration sensing unit.

An invention according to claim 10 of the present application is the sieving device according to claim 9, in which the acceleration sensing unit includes a first acceleration sensing unit configured to sense acceleration at least in a direction parallel to the one direction in which the vibration unit performs reciprocating vibration, in plan view.

An invention according to claim 11 of the present application is the sieving device according to claim 9, in which the acceleration sensing unit includes a second acceleration sensing unit configured to sense acceleration at least in a direction orthogonal to the one direction in which the vibration unit performs reciprocating vibration, in plan view.

An invention according to claim 12 of the present application is the sieving device according to claim 9, in which the acceleration sensing unit includes a first acceleration sensing unit configured to sense acceleration in a direction parallel to the one direction in which the vibration unit performs reciprocating vibration, in plan view, and a second acceleration sensing unit configured to sense acceleration in a direction orthogonal to the one direction in which the vibration unit performs reciprocating vibration, in plan view.

An invention according to claim 13 of the present application is the sieving device according to claim 12, in which vibration electric motors are provided on respective sides of a central axis of the vibration unit in the one direction, and a first acceleration sensing unit and a second acceleration sensing unit are provided to each of the vibration electric motors.

An invention according to claim 14 of the present application is the sieving device according to any one of claims 9 to 13, in which the vibration monitoring device displays an anomaly cause and handling method of the anomaly cause on a display device when a measured value is beyond a predetermined threshold value.

Advantageous Effects of Invention

According to the present invention, the vibration state of a vibration unit can be always monitored, and thus it can be immediately detected that the vibration state is beyond an appropriate range. Accordingly, machine failure or the like can be immediately handled, thereby preventing sieving accuracy decrease.

In addition, a second sensor unit including a mount acceleration sensing unit capable of sensing the acceleration of a mount, and a mount angular velocity sensing unit capable of sensing the angular velocity of the mount is provided to measure the vibration state of the mount, and thus it is possible to know, for example, the horizontal state of the mount, the degree of vibration transfer from any adjacent machine, and the degree of shake due to the hardness of a foundation such as a ground or a structure on which the mount is installed. Moreover, it is possible to reduce sieving performance decrease due to influence of these factors.

In addition, a vibration state measurement unit can measure, based on acceleration sensed by a vibration-unit acceleration sensing unit, displacement in a direction orthogonal to one direction in which the vibration unit vibrates, and thus it is possible to accurately measure the magnitude of vibration in directions orthogonal to the one direction without influence of vibration in the one direction, which leads to improved anomaly sensing accuracy.

In addition, a monitoring device configured to display the vibration state measured by the vibration state measurement unit is provided, and thus it is possible to know the vibration state in real time, which allows early recognition of anomaly occurrence.

In addition, the vibration state of the vibration electric motor can be constantly monitored, and thus it is possible to swiftly detect and immediately handle anomaly of bearings, attachment bolts, shaft bushes, and the like of the vibration electric motor. Accordingly, it is possible to prevent sieving accuracy decrease and durability decrease of the vibration electric motor.

In addition, a first acceleration sensing unit configured to sense acceleration in a direction parallel to the one direction in which the vibration unit performs reciprocating vibration, in plan view, is provided, and thus it is possible to immediately sense not only the vibration state of the vibration electric motor but also the vibration state of the vibration unit and anomaly of reciprocating vibration due to, for example, failure of a part supporting the vibration unit.

In addition, a second acceleration sensing unit configured to sense acceleration in a direction orthogonal to the one direction in which the vibration unit performs reciprocating vibration, in plan view, is provided, and thus it is possible to accurately measure the vibration state in the direction orthogonal to the one direction without influence of the vibration in the one direction, which is normal vibration of the vibration unit, thereby achieving improved anomaly sensing accuracy.

In addition, vibration electric motors are provided on respective sides of a central axis of the vibration unit in the one direction, and the first acceleration sensing unit and the second acceleration sensing unit are provided to each of the vibration electric motors, and thus it is possible to swiftly sense malfunction of synchronization of the two vibration electric motors.

In addition, a vibration monitoring device displays an anomaly cause and a handling method of the anomaly cause on a display device when a measured value is beyond a predetermined threshold value, and thus anomaly that has occurred can be immediately and correctly handled by even an inexperienced person.

DESCRIPTION OF EMBODIMENTS

Embodiments of the present invention will be described below, for example, with reference to the accompanying drawings. Note that the present invention is not limited to the embodiments.

First Embodiment

FIGS. 1 to 5 illustrate a first embodiment of the present invention.

Figure 1:
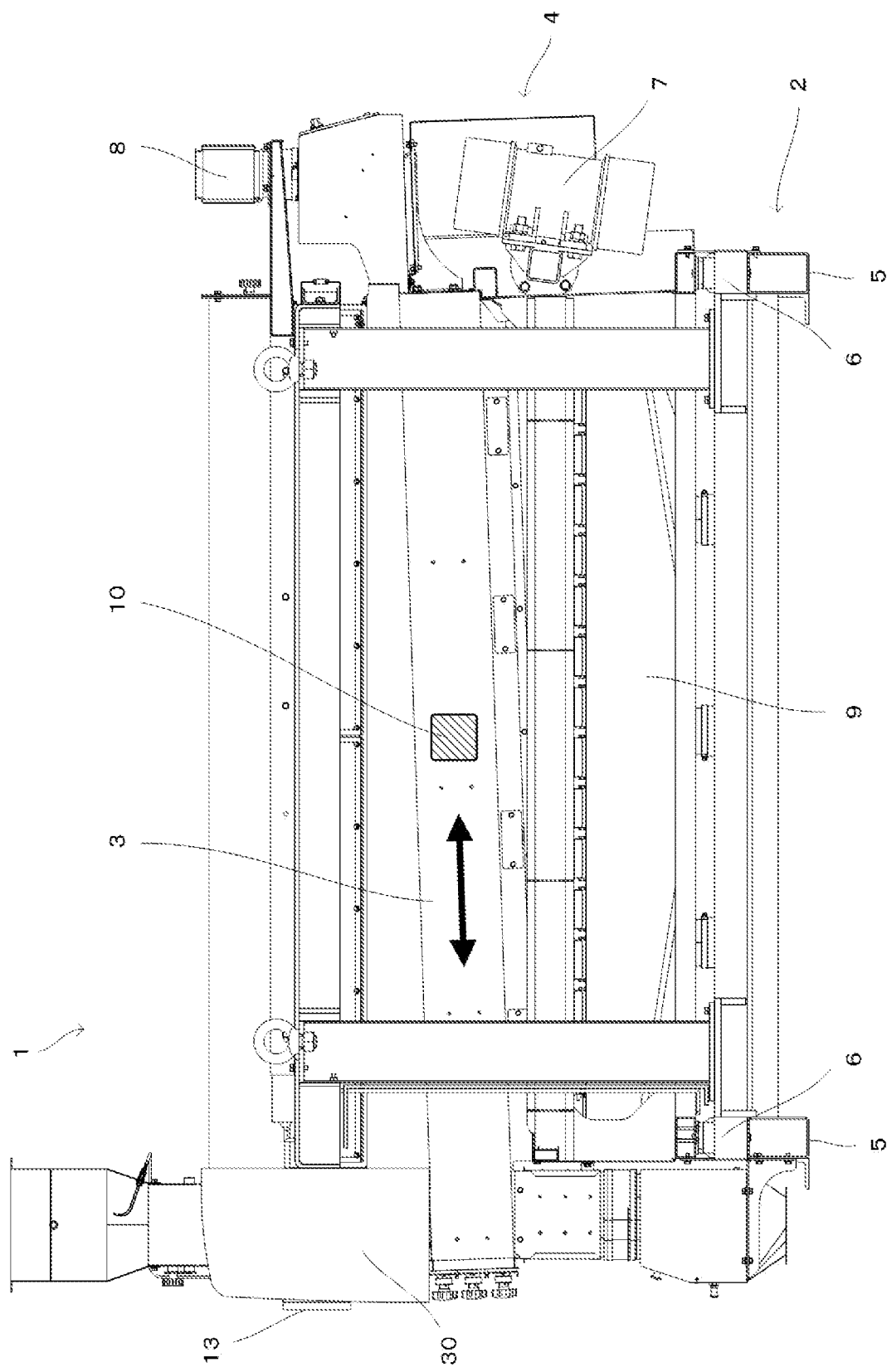
FIG. 1 is a side view of a sieving device as a first embodiment of the present invention.
Figure 2:
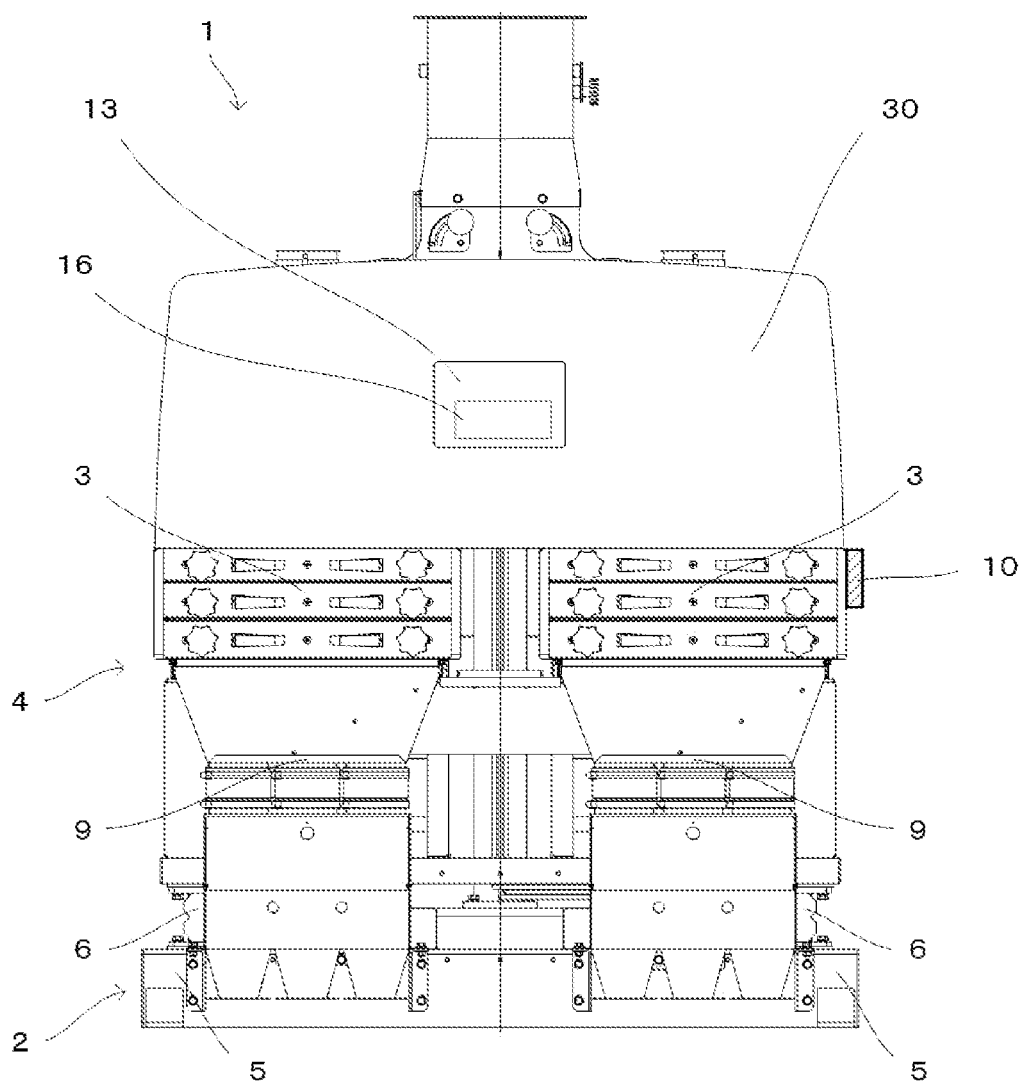
FIG. 2 is a front view of the sieving device as the first embodiment of the present invention.

As illustrated in FIGS. 1 and 2, a sieving device 1 of the present invention includes a mount 2, and a vibration unit 4 configured to perform reciprocating vibration relative to the mount 2 in one direction in plan view and including a sieve frame 3.

In the following description, the direction in which the vibration unit 4 performs reciprocating vibration is referred to as an X direction (the right-left direction of the sheet of FIG. 1 and the depth direction of the sheet of FIG. 2), a direction orthogonal to the X direction in plan view is referred to as a Y direction (the depth direction of the sheet of FIG. 1 and the right-left direction of the sheet of FIG. 2), and a direction orthogonal to the X direction and the Y direction is referred to as a Z direction (the up-down directions of the sheets of FIGS. 1 and 2).

Pillars 5 are provided at four corners of the mount 2, and rubber springs 6 attached to the pillars 5 support the vibration unit 4.

The vibration unit 4 is provided with a vibration electric motor 7, and the vibration unit 4 performs reciprocating vibration in the X direction when the vibration electric motor 7 is actuated.

The mount 2 is provided with a non-illustrated frame, and the frame is provided with a cover 30. The mount 2, the frame, and the cover 30 do not perform reciprocating vibration.

A supply tube 8 supplies, from above into the sieve frame 3, granular substances to be sieved.

In the sieve frame 3 of the vibration unit 4, a plurality of sieve meshes having different mesh sizes are stacked in descending order of mesh size from top.

A collection device 9 configured to collect, by grade, granular substances having passed through sieve meshes of the sieve frame 3 is installed in the vibration unit 4, and the granular substances collected by the collection device 9 are taken out of the device. Granular substances remaining on the sieve frame 3 are discharged out of the device through a path different from that of the granular substances collected by the collection device 9.

The above-described structure has been conventionally known and thus detailed description thereof will be omitted.

As illustrated in FIGS. 1 and 2, a first sensor unit 10 is attached to the outer surface of the sieve frame 3 of the vibration unit 4.

Figure 3:
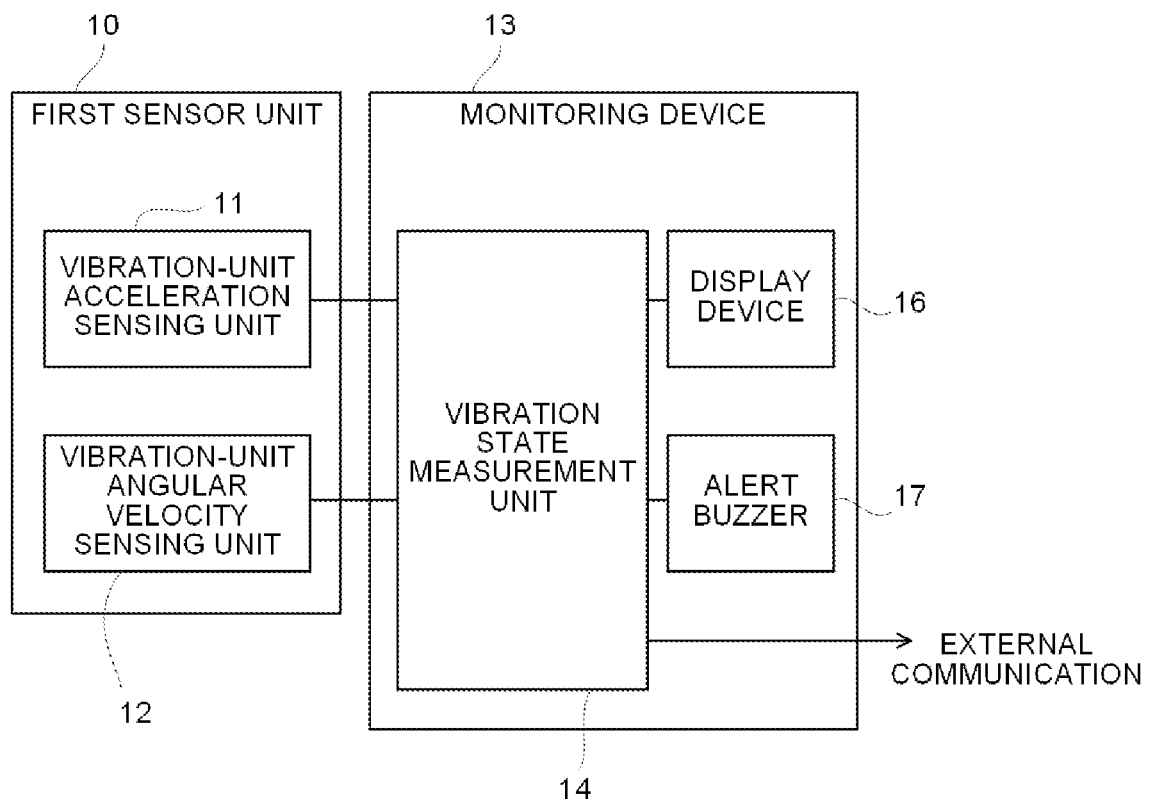
FIG. 3 is a block diagram of a monitoring device and a first sensor unit according to the first embodiment of the present invention.

As illustrated in FIG. 3, the first sensor unit 10 includes a vibration-unit acceleration sensing unit 11 capable of sensing the acceleration of the vibration unit 4 in each of the three axial directions, and a vibration-unit angular velocity sensing unit 12 capable of sensing the angular velocity of the vibration unit 4 in each of the three axial directions.

The first sensor unit 10 is connected to a monitoring device 13 (refer to FIG. 2) installed on the outer surface of the cover 30.

The monitoring device 13 includes a vibration state measurement unit 14, a display device 16, and an alert buzzer 17.

The vibration-unit acceleration sensing unit 11 and the vibration-unit angular velocity sensing unit 12 of the first sensor unit 10, the display device 16, and the alert buzzer 17 are connected to the vibration state measurement unit 14. In addition, the vibration state measurement unit 14 is connected to an operation management system of a facility through a general-purpose external communication means.

The vibration state measurement unit 14 is an arithmetic processing unit and measures the vibration state of the vibration unit 4 based on the acceleration of the vibration unit 4, which is sensed by the vibration-unit acceleration sensing unit 11, and the angular velocity of the vibration unit 4, which is sensed by the vibration-unit angular velocity sensing unit 12. The measured vibration state converted into display information and transferred to the display device 16.

Figure 4:
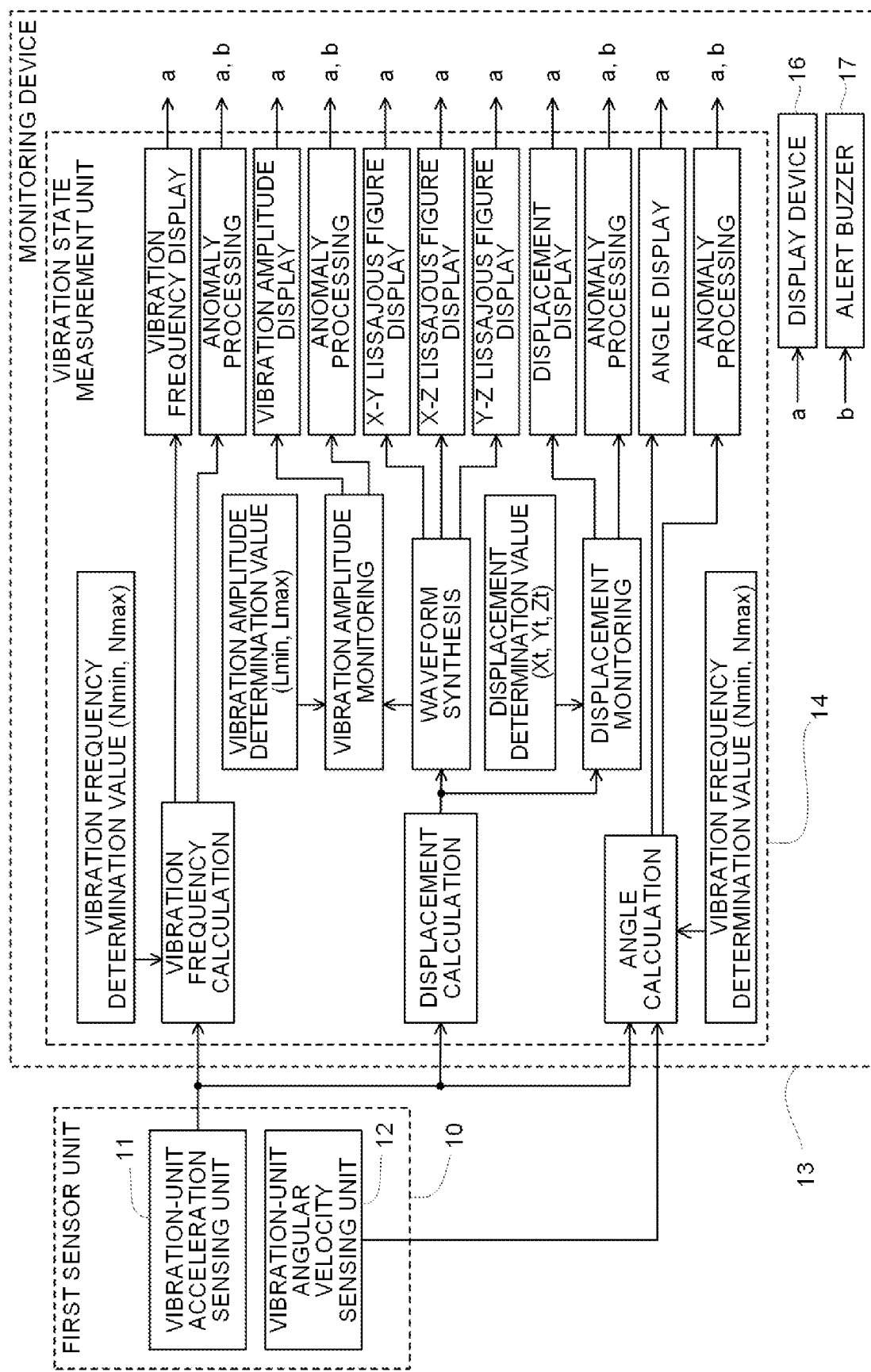
FIG. 4 is a block diagram of signal processing at the sieving device as the first embodiment of the present invention.

Subsequently, signal processing at the sieving device 1 will be described below with reference to FIG. 4.

The sieving device 1 is activated upon an operation-start operation, and then, the vibration unit 4 performs reciprocating vibration and the first sensor unit 10 starts sensing.

The acceleration of the vibration unit 4, which is sensed by the vibration-unit acceleration sensing unit 11, and the angular velocity of the vibration unit 4, which is sensed by the vibration-unit angular velocity sensing unit 12 in the first sensor unit 10 are each transferred to the vibration state measurement unit 14 through wireless communication or wired communication.

The vibration state measurement unit 14 measures displacement of the vibration unit 4 in each of the three axial directions and the vibration frequency thereof in the X-axis direction based on the acceleration of the vibration unit 4, and measures the vibration angle of the vibration unit 4 in each of the three directions based on the acceleration and the angular velocity of the vibration unit 4.

The displacement measurement is performed by removing noise from the sensed acceleration and performing integration twice without influence of gravitational acceleration.

The vibration angle is calculated from the acceleration and angular velocity of the vibration unit 4 by using a Kalman filter, an extended Kalman filter, a Madgwick filter, a complementary filter, or the like.

Figure 5:
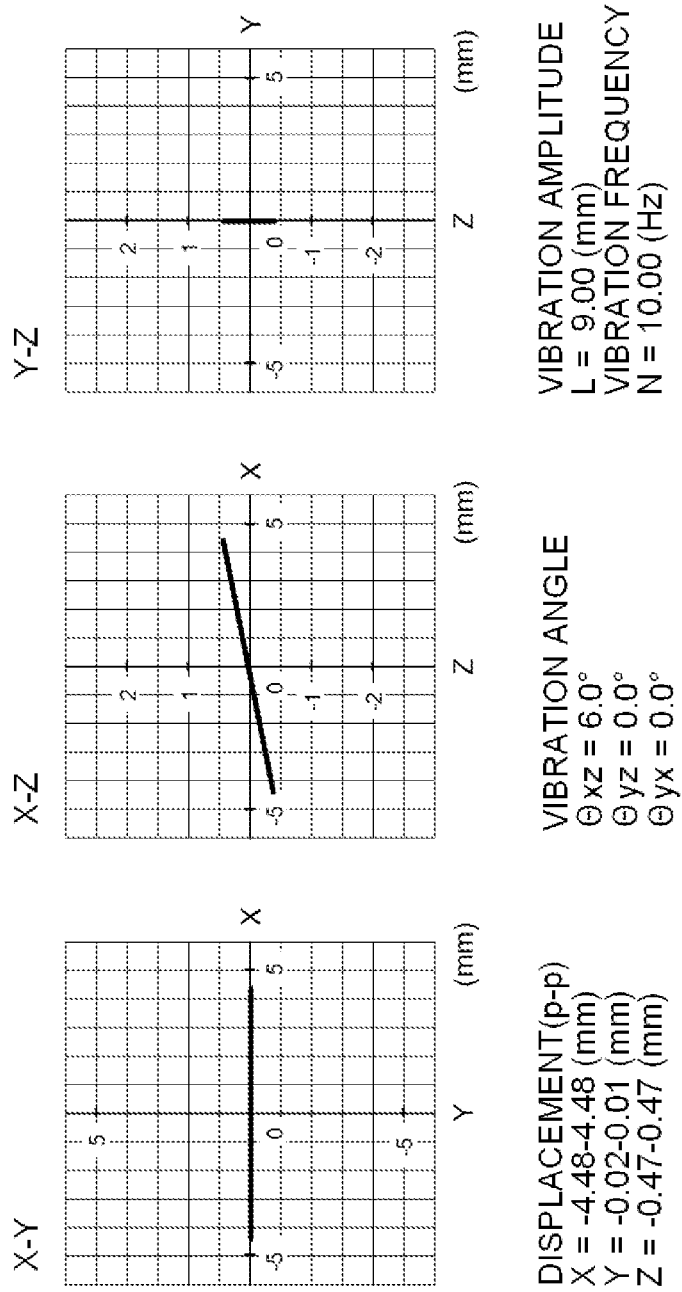
FIG. 5 is a diagram illustrating exemplary display on the monitoring device in the first embodiment of the present invention.

The vibration state measurement unit 14 synthesizes a waveform based on the measured displacement of the vibration unit 4 in the X-axis, Y-axis, and Z-axis directions, and as illustrated in FIG. 5, the size and direction of the displacement are displayed as an X-Y Lissajous figure (the left figure in FIG. 5), an X-Z Lissajous figure (the middle figure in FIG. 5), and a Y-Z Lissajous figure (the right figure in FIG. 5), which are orthogonal to one another, on a display screen of the display device 16.

In addition, the displacement of the vibration unit 4 in each of the X-axis, the Y-axis, and Z-axis directions, the vibration angle in each of the three directions (a tilt angle in the X-Y plane, a tilt angle in the X-Z plane, and a tilt angle in the Y-Z plane due to vibration), the vibration frequency in the X-axis direction, and a vibration amplitude in the X-axis direction, which is measured from the synthesized waveform are displayed as numerical values on the screen of the display device 16.

The display of FIG. 5 indicates that the operation is stable because the displacement is −4.48 to 4.48 mm in the X-axis direction, −0.02 to 0.01 mm in the Y-axis direction, and −0.47 to 0.47 mm in the Z-axis direction, the vibration angle is the tilt angle of 6.0° in the X-Z plane, the tilt angle of 0.0° in the X-Y plane, and the tilt angle of 0.0° in the Y-Z plane, the vibration amplitude in the X-axis direction is 9.00 mm, and the vibration frequency in the X-axis direction is 10.00 Hz.

As indicated by the numerical values, the vibration unit 4 is vibrating in the X-axis direction, slightly vibrating in the Z-axis direction, and hardly vibrating in the Y-axis direction. The tilt angle of 6.0° in the X-Z plane indicates that the sieve frame 3 is tilted on the lower left side in the sheet as illustrated in FIG. 1, and in reality, the vibration unit 4 does not vibrate in parallel to the X-axis direction but vibrates at tilt as illustrated with a double-headed arrow in FIG. 1.

The displacement, vibration angle, vibration frequency, and vibration amplitude of the vibration unit 4 in their appropriate ranges are set as determination values to the vibration state measurement unit 14 in advance. The vibration state measurement unit 14 compares measured displacement with the displacement determination value, compares a measured vibration angle with the angle determination value, compares a measured vibration frequency with the vibration frequency determination value, and compares a measured vibration amplitude with the vibration amplitude determination value.

When all measured values obtained by the vibration state measurement unit 14 are within the determination values, characters such as "the operation is stable" are displayed on the screen of the display device 16, together with display of the vibration state of the vibration unit 4, to indicate that the operation is normal.

When these values are beyond the determination values, anomaly processing is performed and the alert buzzer 17 is actuated, and also, anomaly occurrence is reported to a worker or a supervisor by changing the character display on the display device 16 to, for example, "unstable".

Second Embodiment

FIGS. 6 to 10 illustrate a second embodiment of the present invention.

Figure 6:
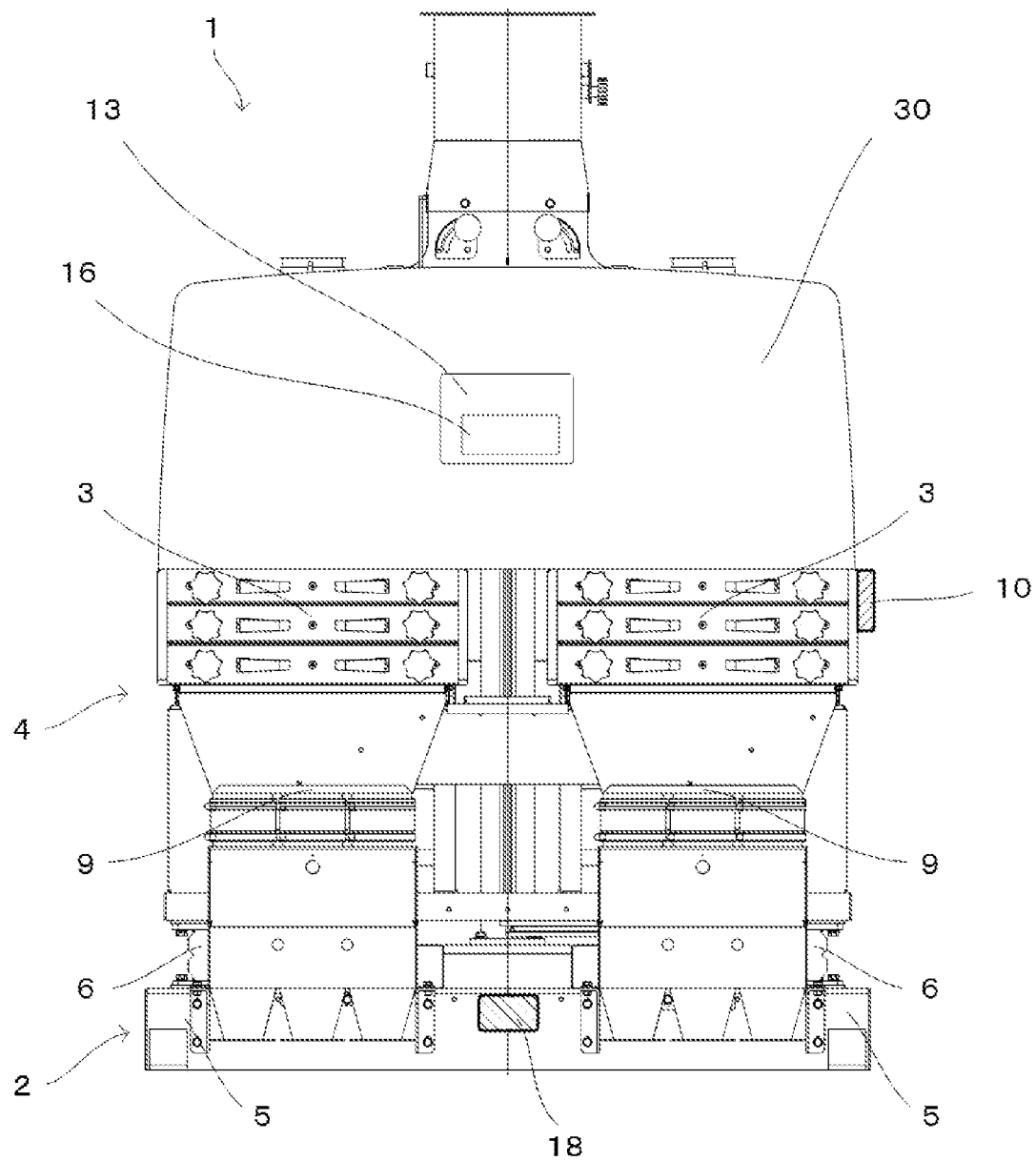
FIG. 6 is a front view of a sieving device as a second embodiment of the present invention.

The second embodiment includes, in addition to the structure of the first embodiment, a second sensor unit 18 attached to the mount 2 as illustrated in FIG. 6.

Similarly to the first sensor unit 10, the second sensor unit 18 includes a mount acceleration sensing unit 19 capable of sensing the acceleration of the mount 2, and a mount angular velocity sensing unit 20 capable of sensing the angular velocity of the mount 2.

Figure 7:
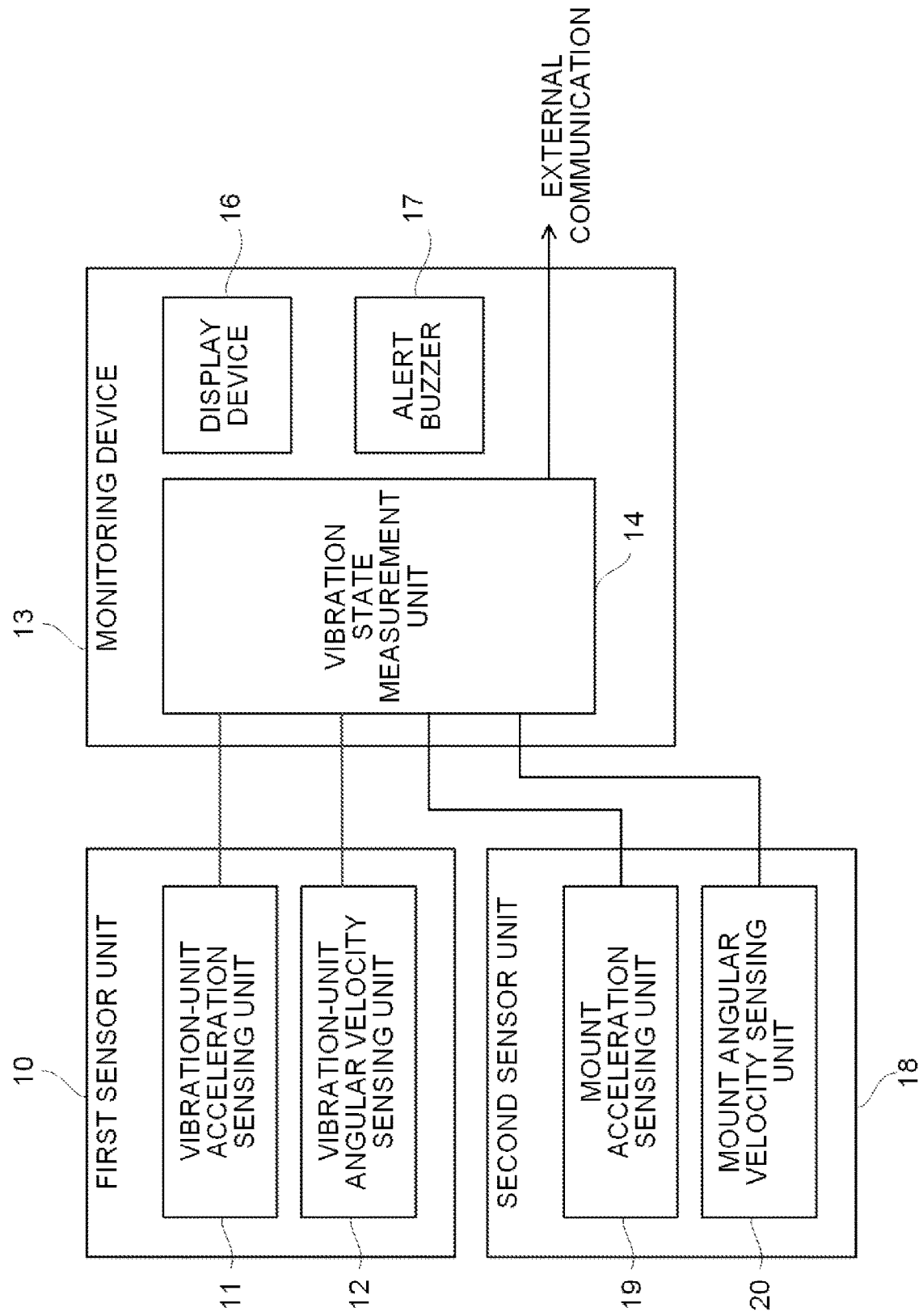
FIG. 7 is a block diagram of a monitoring device, a first sensor unit, and a second sensor unit according to the second embodiment of the present invention.

As illustrated in FIG. 7, the second sensor unit 18 is connected to the vibration state measurement unit 14 of the monitoring device 13. The acceleration of the mount 2, which is sensed by the mount acceleration sensing unit 19 of the second sensor unit 18, and the angular velocity of the mount 2, which is sensed by the mount angular velocity sensing unit 20 are transmitted to the vibration state measurement unit 14 of the monitoring device 13.

Similarly to measurement of the vibration state of the vibration unit 4 in the first embodiment, the vibration state measurement unit 14 measures the vibration state of the mount 2. Accordingly, the installation angle of the mount 2, influence of vibration conveyed from any machine disposed around the mount 2, shake of the mount 2 depending on the hardness of a foundation on which the sieving device 1 is installed can be sensed as displacement.

Note that the mount 2 is normally fixed and not affected by reciprocating vibration of the vibration unit 4 because of the rubber springs 6, and thus, typically, the displacement and installation angle thereof are measured but the vibration frequency and vibration amplitude thereof are not measured.

Figure 8:
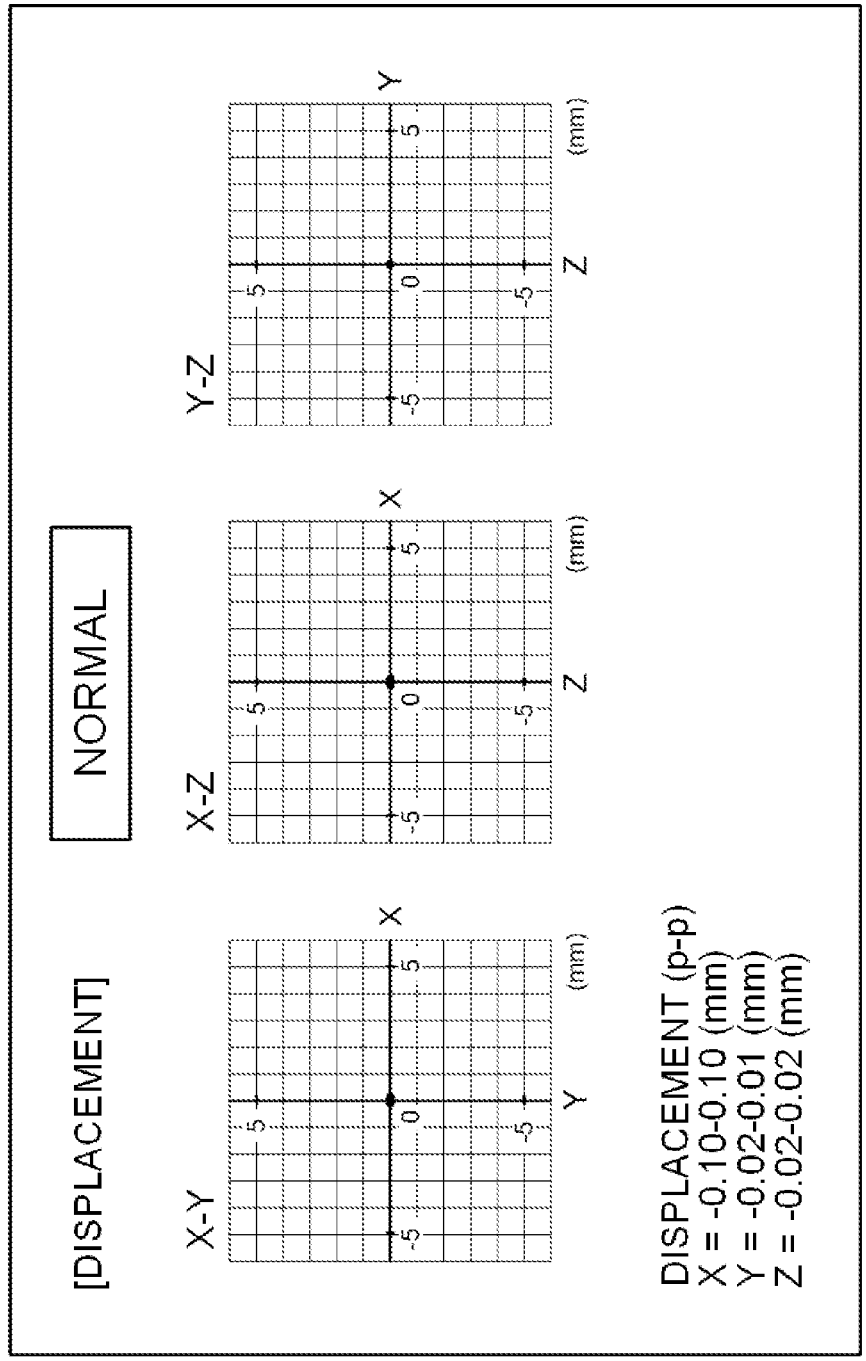
FIG. 8 is a diagram illustrating exemplary display on the monitoring device in the second embodiment of the present invention.

The vibration state measurement unit 14 converts the measured vibration state of the mount 2 into display information and feeds the display information to the display device 16 so that the vibration state of the vibration unit 4 is displayed on the screen of the display device 16 as illustrated in FIG. 8.

The displacement of the mount 2 is displayed as an X-Y Lissajous figure (the left figure in FIG. 8), an X-Z Lissajous figure (the middle figure in FIG. 8), and a Y-Z Lissajous figure (the right figure in FIG. 8), which are orthogonal to one another, on the display screen of the display device 16.

In addition, the displacement of the mount 2 in each of the X-axis, the Y-axis, and Z-axis directions is displayed as a numerical value.

The display of FIG. 8 indicates that the operation is normal because the displacement is −0.10 to 0.10 mm in the X-axis direction, −0.02 to 0.01 mm in the Y-axis direction, and −0.02 to 0.02 mm in the Z-axis direction.

As indicated by these numerical values, the mount 2 is hardly displaced, in other words, not receiving vibration of the vibration unit 4, which indicates that the rubber springs 6 adequately function.

The displacement of the mount 2 in its appropriate range is set as a determination value to the vibration state measurement unit 14, and the vibration state measurement unit 14 compares the measured displacement with the displacement determination value.

When each measured value obtained by the vibration state measurement unit 14 is within the determination value, characters such as "normal" are displayed on the screen of the display device 16.

When the measured value is beyond the determination value, anomaly processing is performed and the alert buzzer 17 is actuated, and also, the character display on the display device 16 is changed from "normal" to, for example, "anomalous".

A worker or a supervisor can immediately understand, based on the character display, whether the actuation of the alert buzzer 17 indicates failure at the vibration unit 4 or the mount 2.

Figure 9:
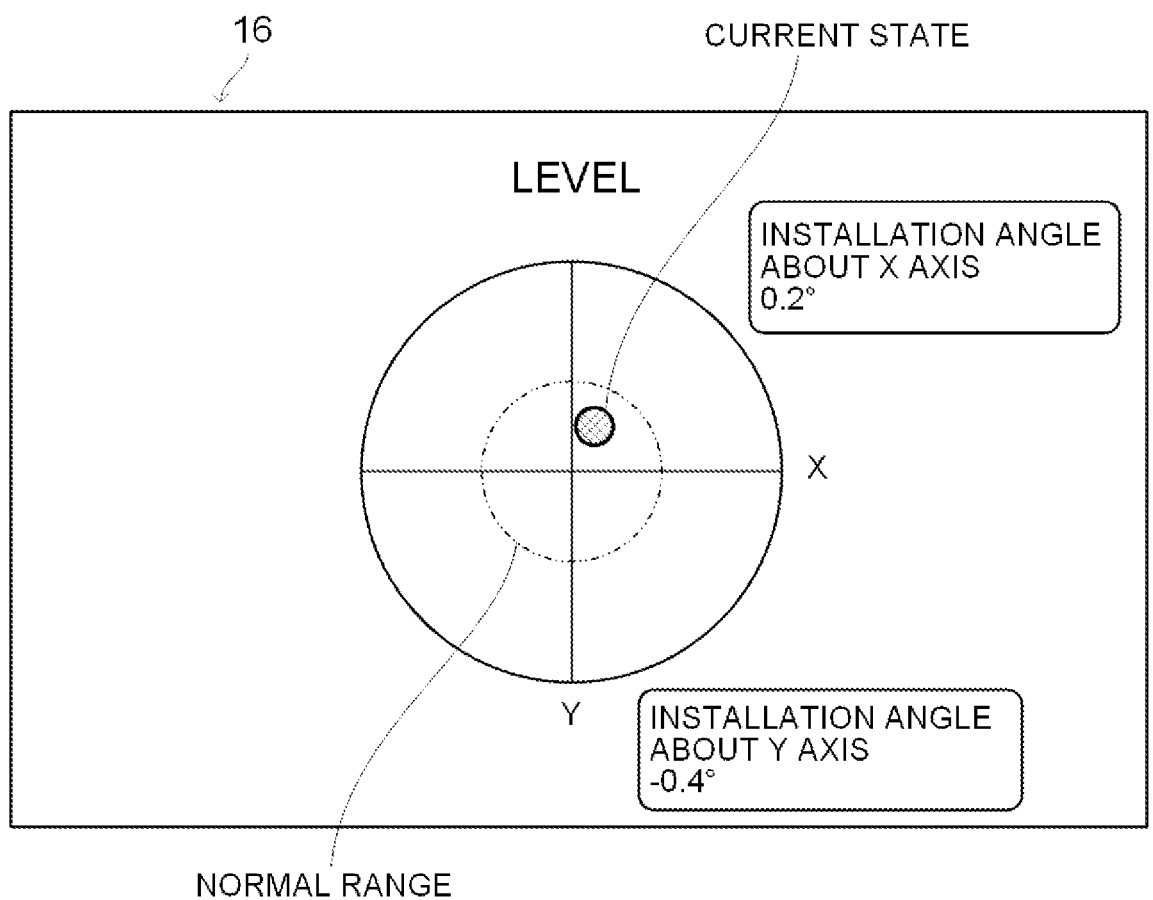
FIG. 9 is a diagram illustrating exemplary display on the monitoring device in the second embodiment of the present invention.

The vibration state measurement unit 14 may convert the measured vibration state of the mount 2 into display information and feed the display information to the display device 16 so that the measured vibration state of the mount 2 is displayed on the screen of the display device 16, together with the vibration state of the vibration unit 4, as illustrated in FIG. 9.

The installation angle of the mount 2 is displayed as an image simulating a level on the display screen of the display device 16.

FIG. 9 illustrates, as a level, the current state of the mount 2 in a circular range with the X and Y axes. The current state of the mount 2 is represented by a circle illustrated with a bold line simulating an air bubble. An allowable range is represented by a dashed and double-dotted line circle. In addition, the installation angle about the X axis and the installation angle about the Y axis are displayed as numerical values. In the drawing, the displayed installation angle about the X axis is 0.2° and the displayed installation angle about the Y axis is −0.4°, which indicates that the current state is within the allowable range and the installation angle of the mount 2 is normal.

Figure 10A:
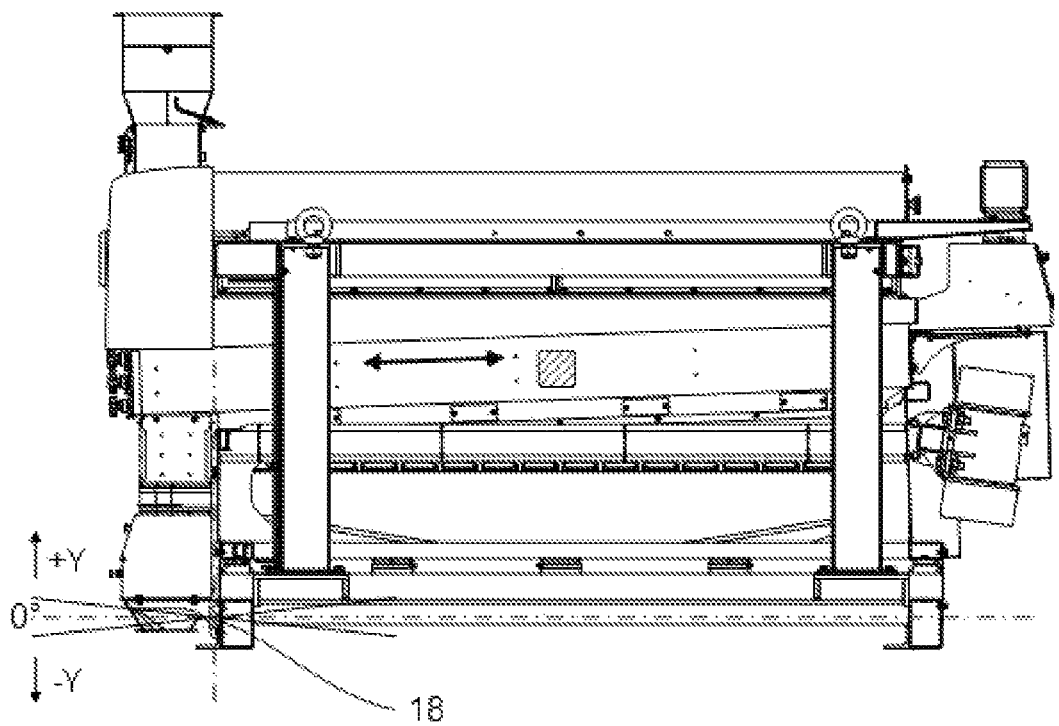
FIG. 10A is a side view illustrating directions of an installation angle of a mount of the sieving device in the second embodiment of the present invention.
Figure 10B:
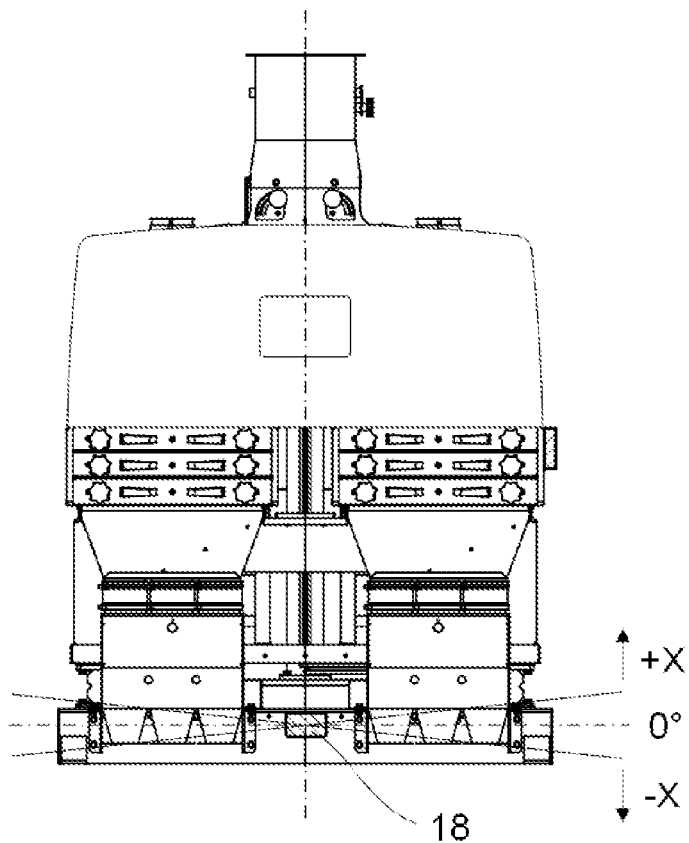
FIG. 10B is a front view illustrating directions of an installation angle of the mount of the sieving device in the second embodiment of the present invention.

FIGS. 10A and 10B illustrate the direction of the installation angle of the mount 2. As illustrated in FIG. 10A, the installation angle of the mount 2 about the Y axis is displayed as a positive value when the left side of the second sensor unit 18 is higher, or as a negative value when the left side of the second sensor unit 18 is lower. As illustrated in FIG. 10B, the installation angle of the mount 2 about the X axis is displayed as a positive value when the right side of the second sensor unit 18 is higher, or as a negative value when the right side of the second sensor unit 18 is lower.

In this manner, with the display simulating a level, the worker or the supervisor can easily understand the installation state of the mount.

Note that, although not illustrated, the display device 16 may be a touch panel, and buttons with characters such as "calibration", "hold", and "reset" may be displayed in operable states on the display screen in addition to an image simulating a level.

For example, the "calibration" button is provided as a momentary switch so that an "ON" state is continued while the button is touched. The "hold" button and the "reset" button are each provided as an alternate switch so that an "ON" state and an "OFF" state are alternately switched each time the button is touched.

At a timing when the "calibration" button is touched and released, the installation angle of the mount 2 about each of the X axis and the Y axis at the timing is set as 0° for measurement of the state of change in the installation angle thereafter.

When the "hold" button is touched, the displayed value of the installation angle of the mount 2 can be stopped at an optional timing. Accordingly, the value of the installation angle displayed on the display screen of the display device 16 can be stopped and checked even in a state in which the measured value of the installation angle continually varies due to vibration conveyed from the vibration unit 4 to the mount 2 and cannot be easily visually recognized.

When the "reset" button is touched, the displayed value of the installation angle of the mount 2 can be set back to an initial adjustment value factory-configured at the vibration state measurement unit 14.

In this manner, the vibration state measurement unit 14 can be adjusted by operating the display device 16 provided to the monitoring device 13, which significantly reduces work for performing adjustment at attachment of the vibration state measurement unit 14 and periodic maintenance.

Determination values of the displacement and installation angle of the mount 2 in their appropriate ranges may be set to the vibration state measurement unit 14, and determination may be performed based on comparison of the measured displacement and installation angle with the respective determination values.

In this case, when all measured values obtained by the vibration state measurement unit 14 are within the determination values, characters such as "normal" are displayed on the screen of the display device 16. When the measured values are beyond the determination values, anomaly processing is performed and the alert buzzer 17 is actuated, and also, the character display on the display device 16 is changed from "normal" to, for example, "anomalous".

In this manner, the worker or the supervisor can immediately understand, based on the character display, whether the actuation of the alert buzzer 17 indicates failure at the vibration unit 4 or the mount 2.

Third Embodiment

Subsequently, a third embodiment will be described below.

Figure 11:
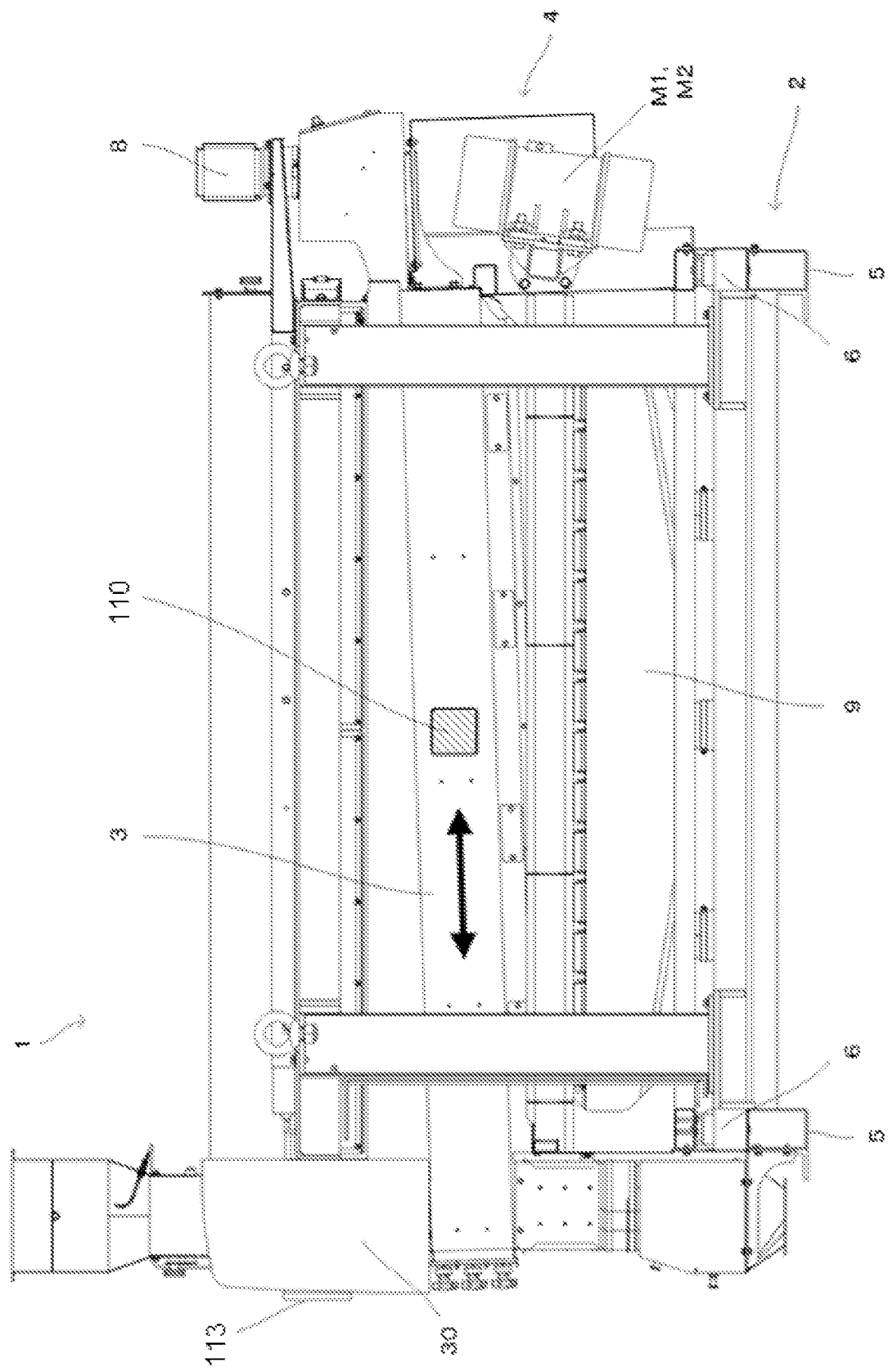
FIG. 11 is a side view of a sieving device as a third embodiment of the present invention.
Figure 12:
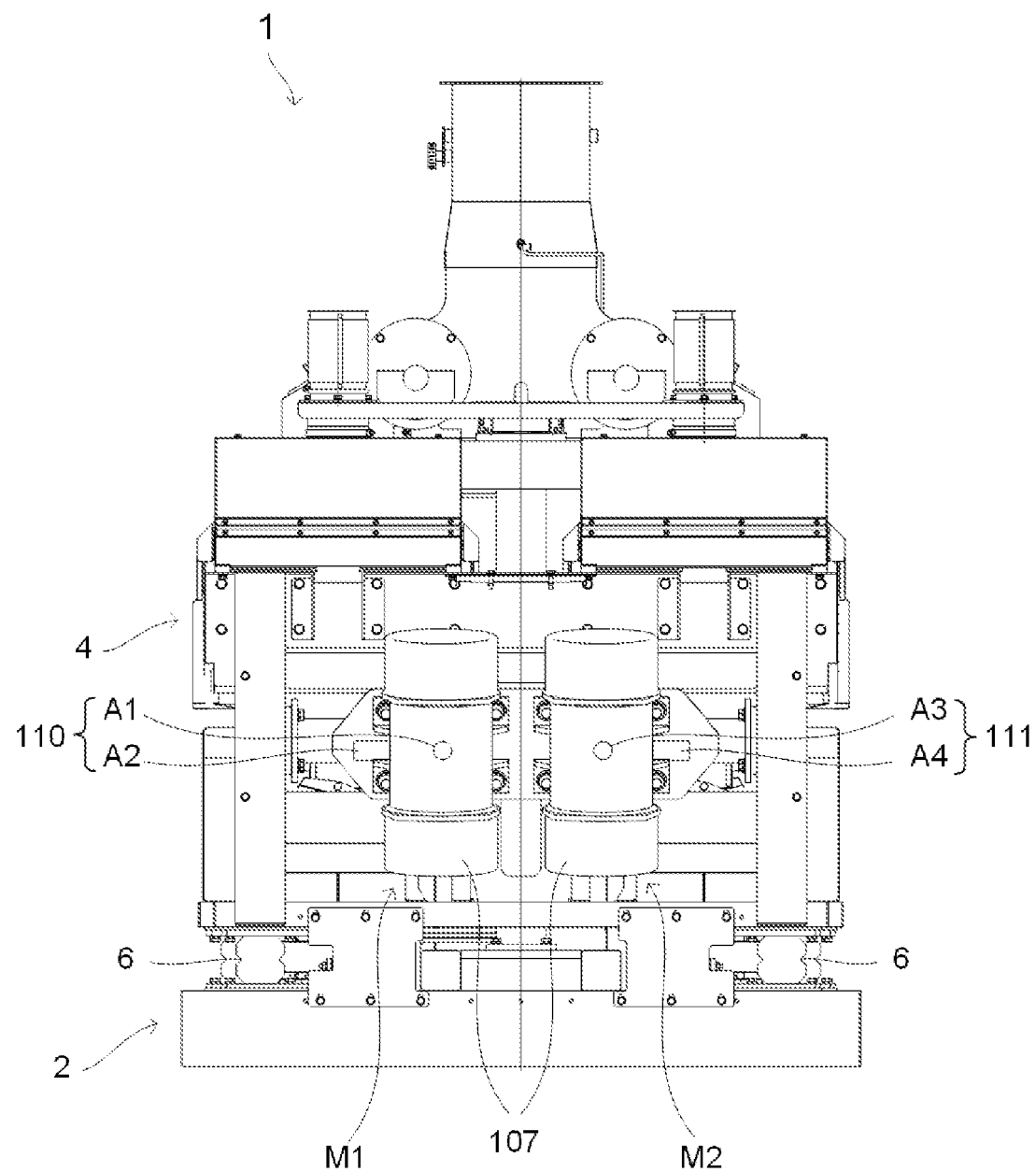
FIG. 12 is a back view of the sieving device as the third embodiment of the present invention.

As illustrated in FIGS. 11 and 12, a sieving device 1 according to the present embodiment includes a mount 2, a vibration unit 4 including a sieve frame 3 and configured to perform reciprocating vibration relative to the mount 2 in one direction in plan view, and two vibration electric motors M1 and M2 each configured to generate reciprocating vibration of the vibration unit 4 by rotating a rotor inside a casing 107.

In the following description, a direction parallel to the direction in which the vibration unit 4 performs reciprocating vibration, in plan view, is referred to as an X direction (the right-left direction of the sheet of FIG. 11 and the depth direction of the sheet of FIG. 12), and a direction orthogonal to the X direction in plan view is referred to as a Y direction (the depth direction of the sheet of FIG. 11 and the right-left direction of the sheet of FIG. 12).

Pillars 5 are provided at four corners of the mount 2, and rubber springs 6 attached to the pillars 5 support the vibration unit 4.

The mount 2 is provided with a non-illustrated frame, and the frame is provided with a cover 30. The mount 2, the frame, and the cover 30 do not perform reciprocating vibration.

A supply tube 8 supplies, from above into the sieve frame 3, granular substances to be sieved.

In the sieve frame 3 of the vibration unit 4, a plurality of sieve meshes having different mesh sizes are stacked in descending order of mesh size from top.

A collection device 9 configured to collect, by grade, granular substances having passed through sieve meshes of the sieve frame 3 is installed in the vibration unit 4, and the granular substances collected by the collection device 9 are taken out of the device. Granular substances remaining on the sieve frame 3 are discharged out of the device through a path different from that of the granular substances collected by the collection device 9.

The above-described structure has been conventionally known and thus detailed description thereof will be omitted.

The vibration electric motors M1 and M2 are provided on respective sides of a central axis of the vibration unit 4 in the X direction. A rotor and an unbalance weight inside each of the casings 107 of the two vibration electric motors M1 and M2 rotate in a direction opposite to the direction of rotation of a rotor and an unbalance weight inside the other casing 107, and the unbalance weights are synchronized to cause reciprocating vibration of the vibration unit 4 in the X direction. For example, the rotor and the unbalance weight inside the casing 107 of each of the vibration electric motors M1 and M2 correspond to a rotor of the present invention. A plane in which the rotation circle of the rotor is included is substantially parallel to the XY plane. The vibration electric motors M1 and M2 vibrate together with the vibration unit 4.

Figure 13A:
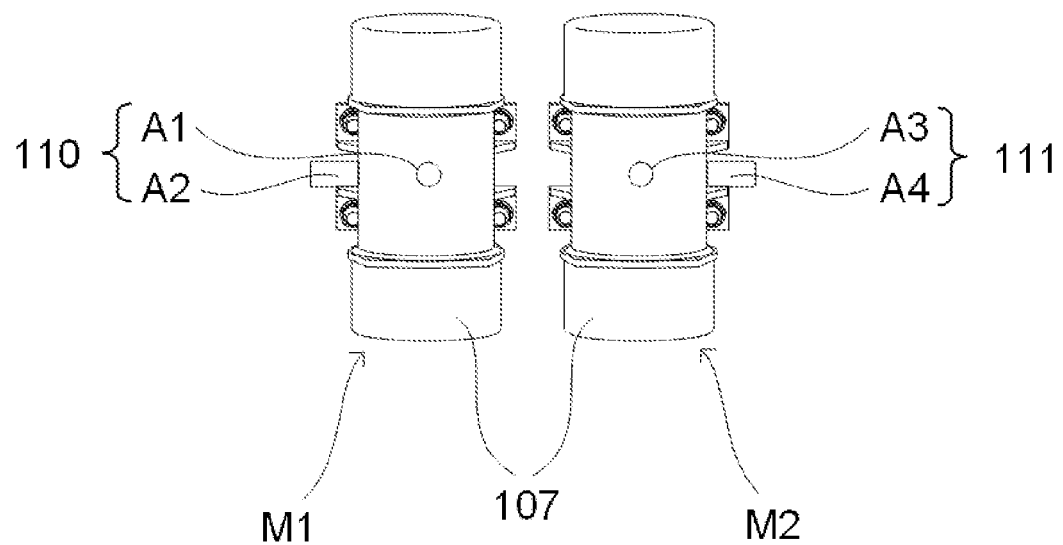
FIG. 13A is a back view of a vibration electric motor in the third embodiment of the present invention.
Figure 13B:
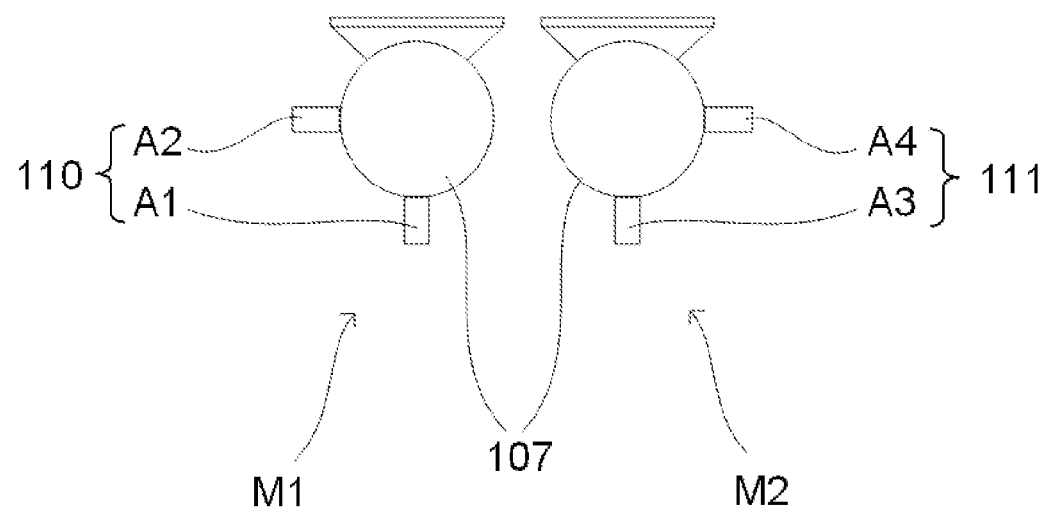
FIG. 13B is a plan view of the vibration electric motor in the third embodiment of the present invention.

As illustrated in FIGS. 13A and 13B, acceleration sensing units 110 and 111 each capable of sensing acceleration in the radial direction of rotation of the rotor are provided on the outer surfaces of the casings 107 of the vibration electric motors M1 and M2, respectively. The acceleration sensing units 110 and 111 sense the acceleration of the vibration electric motors M1 and M2.

The acceleration sensing unit 110 of the vibration electric motor M1 includes a first acceleration sensing unit A1 configured to sense the acceleration in the X direction, and a second acceleration sensing unit A2 configured to sense the acceleration in the Y direction.

The acceleration sensing unit 111 of the vibration electric motor M2 includes a first acceleration sensing unit A3 configured to sense the acceleration in the X direction, and a second acceleration sensing unit A4 configured to sense the acceleration in the Y direction.

The first acceleration sensing units A1 and A3 are each a sensor configured to sense acceleration in one axial direction and each installed to sense the acceleration of the corresponding one of the vibration electric motors M1 and M2 in the X direction in the radial direction of rotation of the rotor. The second acceleration sensing units A2 and A4 are each a sensor configured to sense acceleration in one axial direction and each installed to sense the acceleration of the corresponding one of the vibration electric motors M1 and M2 in the Y direction in the radial direction of rotation of the rotor.

Figure 14:
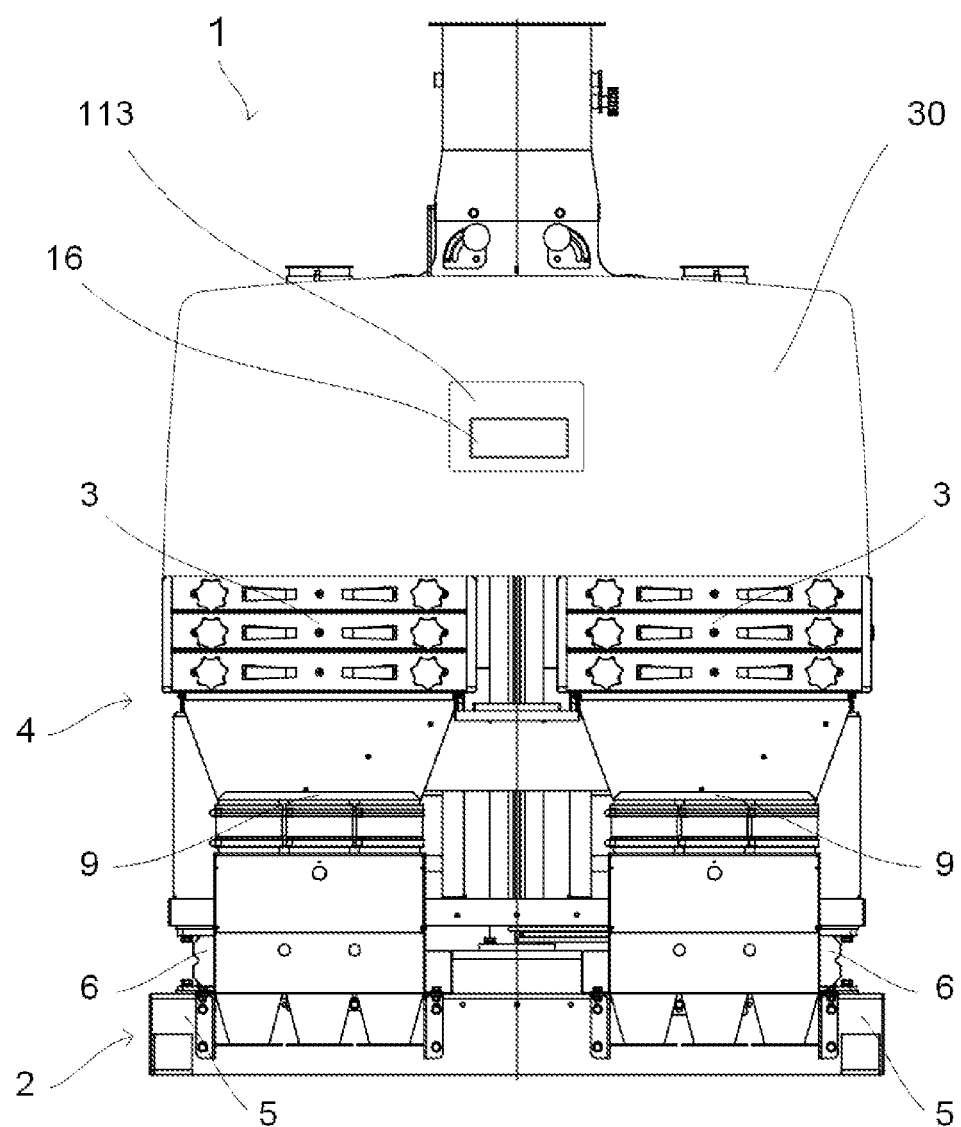
FIG. 14 is a front view of the sieving device as the third embodiment of the present invention.
Figure 15:
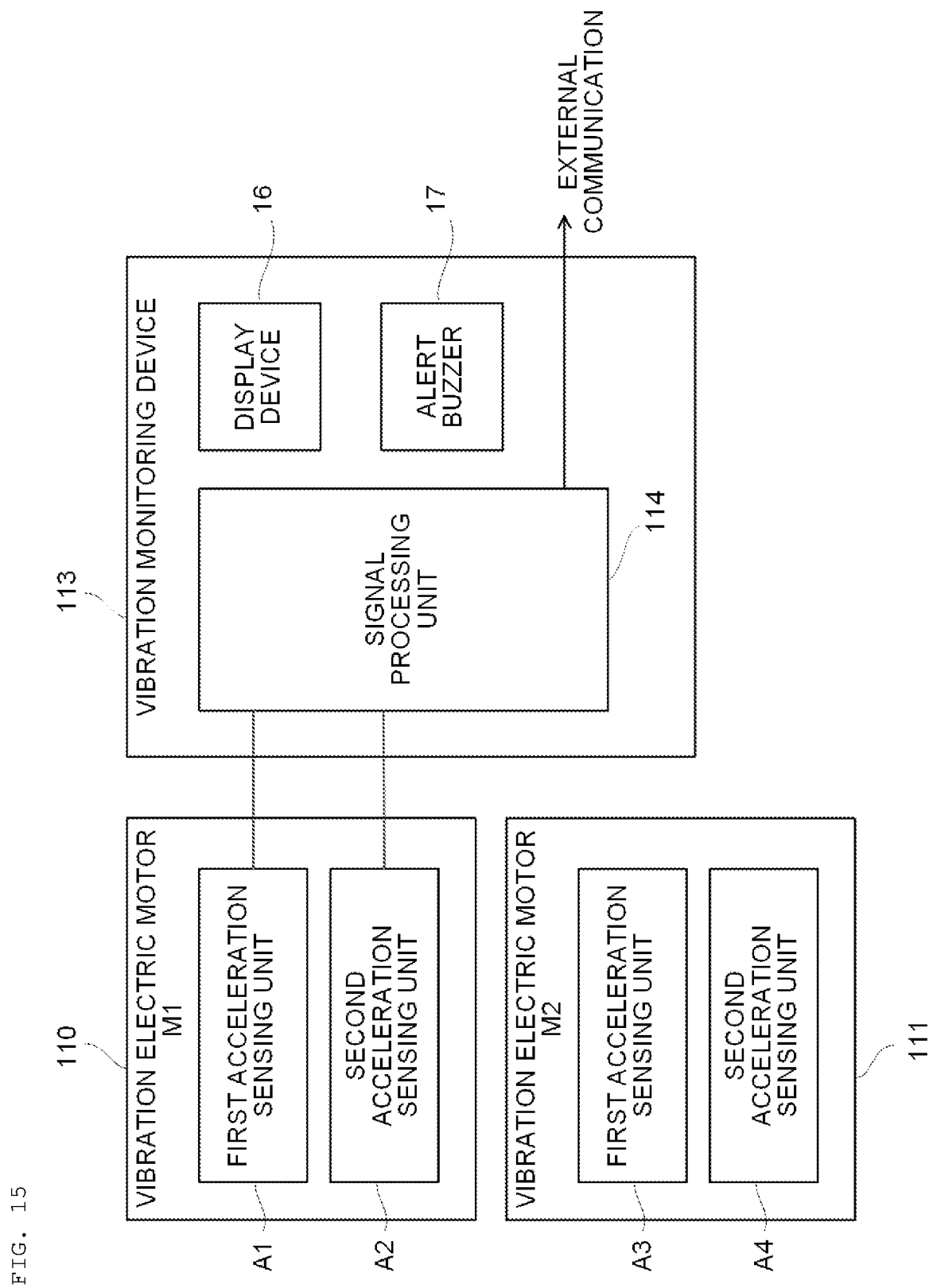
FIG. 15 is a block diagram of an acceleration sensing unit and a vibration monitoring device in the third embodiment of the present invention.

As illustrated in FIG. 15, the first acceleration sensing units A1 and A3 and the second acceleration sensing units A2 and A4 are connected to a vibration monitoring device 113 (refer to FIG. 14) installed on the outer surface of the cover 30.

The vibration monitoring device 113 includes a signal processing unit 114, a display device 16, and an alert buzzer 17.

The first acceleration sensing units A1 and A3, the second acceleration sensing units A2 and A4, the display device 16, and the alert buzzer 17 are connected to the signal processing unit 114. In addition, the signal processing unit 114 is connected to an operation management system of a facility through a general-purpose external communication means.

Figure 16:
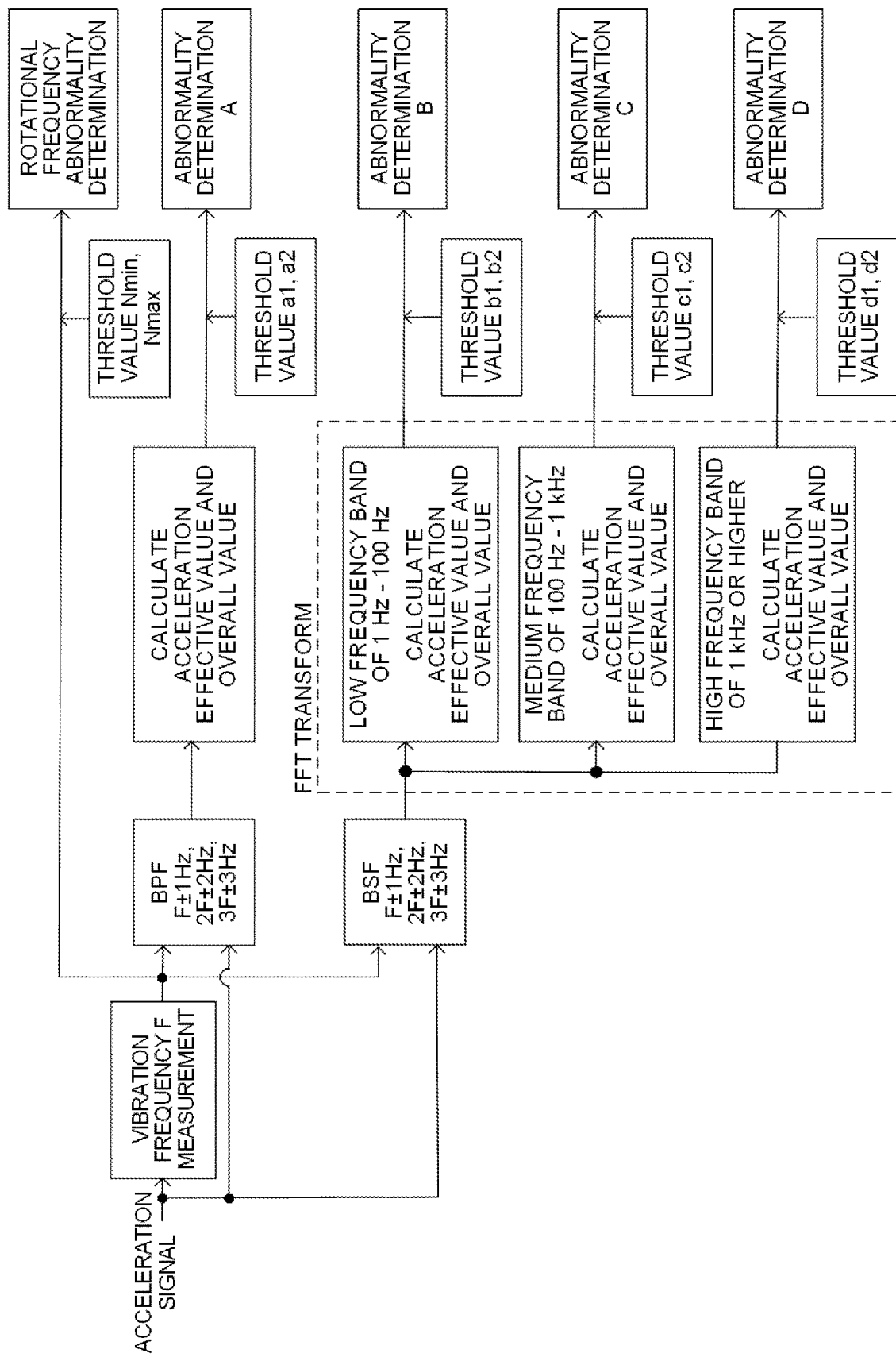
FIG. 16 is a block diagram of signal processing at the sieving device as the third embodiment of the present invention.

Subsequently, signal processing at the sieving device 1 will be described below with reference to FIG. 16.

The sieving device 1 is activated upon an operation-start operation, and then, the vibration electric motors M1 and M2 rotate and the vibration unit 4 performs reciprocating vibration in the X direction (in reality, the vibration unit 4 does not vibrate in parallel to the X direction but vibrates at a tilt as illustrated with a double-headed arrow in FIG. 11). Simultaneously with vibration start, the first acceleration sensing unit A1 and the second acceleration sensing unit A2 of the vibration electric motor M1 and the first acceleration sensing unit A3 and the second acceleration sensing unit A4 of the vibration electric motor M2 start sensing.

Acceleration signals of the vibration electric motors M1 and M2 in the X and Y directions, which are acquired by the first acceleration sensing units A1 and A3 and the second acceleration sensing units A2 and A4 are transferred to the signal processing unit 114 through wireless communication or wired communication.

The signal processing unit 114 detects a vibration frequency F of each of the vibration electric motor M1 and a vibration electric motor M2 in the X and Y directions based on the acceleration signals transferred from the first acceleration sensing units A1 and A3 and the second acceleration sensing units A2 and A4.

Then, the vibration frequency F is compared with vibration frequency threshold values Fmin and Fmax that are set as a normal range in advance, thereby performing anomaly determination. When the detected vibration frequency F is beyond the threshold values Fmin and Fmax, the signal processing unit 114 performs warning processing.

Since reciprocating vibration is performed in the X direction, it is expected that the vibration frequency is lower in the Y direction than in the X direction. Thus, anomaly can be detected early when the threshold value Fmax is set to be small for the Y direction.

In this vibration-frequency anomaly determination, for example, whether the vibration unit operates at a predetermined vibration frequency or whether a vibrator operates at a predetermined vibration frequency can be determined.

In addition, a signal of the vibration frequency F, a signal of a frequency 2F that is two times higher than the vibration frequency F, and a signal of a frequency 3F that is three times higher than the vibration frequency F are subjected to processing that attenuates any band other than a predetermined band through a band-pass filter (BPF), their acceleration effective values are summed up, and the summed value is compared with threshold values a1 and a2 set in advance, thereby performing anomaly determination A. In an example illustrated in FIG. 16, any band other than F±1 Hz, 2F±2 Hz, and 3F±3 Hz is attenuated, but these ranges may be optionally changed.

As a result of the anomaly determination A, the signal processing unit 114 performs attention processing when the summed value exceeds the threshold value a1 but does not reach the threshold value a2, or performs warning processing when the summed value exceeds the threshold value a2.

In addition, the signal processing unit 114 removes, through a band stop filter (BSF), a predetermined band from the signal of the vibration frequency F, the signal of the frequency 2F that is two times higher than the vibration frequency F, and the signal of the frequency 3F that is three times higher than the vibration frequency F, performs FFT transform of signals thus obtained, and calculates an overall value for each of a low frequency band (1 Hz to 100 Hz), an intermediate frequency band (100 Hz to 1 kHz), and a high frequency band (1 kHz or higher). In the example illustrated in FIG. 16, removal frequency bands are F±1 Hz, 2F±2 Hz, and 3F±3 Hz, but these ranges may be optionally changed.

Then, anomaly determination B is performed through comparison of the overall value of the low frequency band with set threshold values b1 and b2, and the attention processing is performed when the overall value exceeds the threshold value b1 but does not reach the threshold value b2, or the warning processing is performed when the overall value exceeds the threshold value b2.

Anomaly determination C is performed through comparison of the overall value of the intermediate frequency band with threshold values c1 and c2, and the attention processing is performed when the overall value exceeds the threshold value c1 but does not reach the threshold value c2, or the warning processing is performed when the overall value exceeds the threshold value c2.

Anomaly determination D is performed through comparison of the overall value of the high frequency band with threshold values d1 and d2, and the attention processing is performed when the overall value exceeds the threshold value d1 but does not reach the threshold value d2, or the warning processing is performed when the overall value exceeds the threshold value d2.

Each threshold value set for performing the attention processing corresponds to such a level that inspection is needed within a month approximately. In the attention processing by the signal processing unit 114, operation of the sieving device 1 is continued, but the existence of anomaly, an anomaly cause corresponding to vibration-state anomaly, and a handling method of the anomaly cause are displayed on the display device 16. In addition, contents same as those of the display on the display device 16 are transferred to the operation management system through external communication.

Each threshold value set for performing the warning processing is larger than the threshold value for performing the attention processing and corresponds such a level that handling is immediately needed. In the warning processing by the signal processing unit 114, operation of the sieving device 1 is immediately stopped, and also, the alert buzzer 17 is actuated to report anomaly occurrence to a worker or a supervisor, and an anomaly cause corresponding to vibration-state anomaly and a handling method of the anomaly cause are displayed on the display device 16. In addition, contents same as those of the display on the display device 16 are transferred to the operation management system through external communication.

Figure 17:
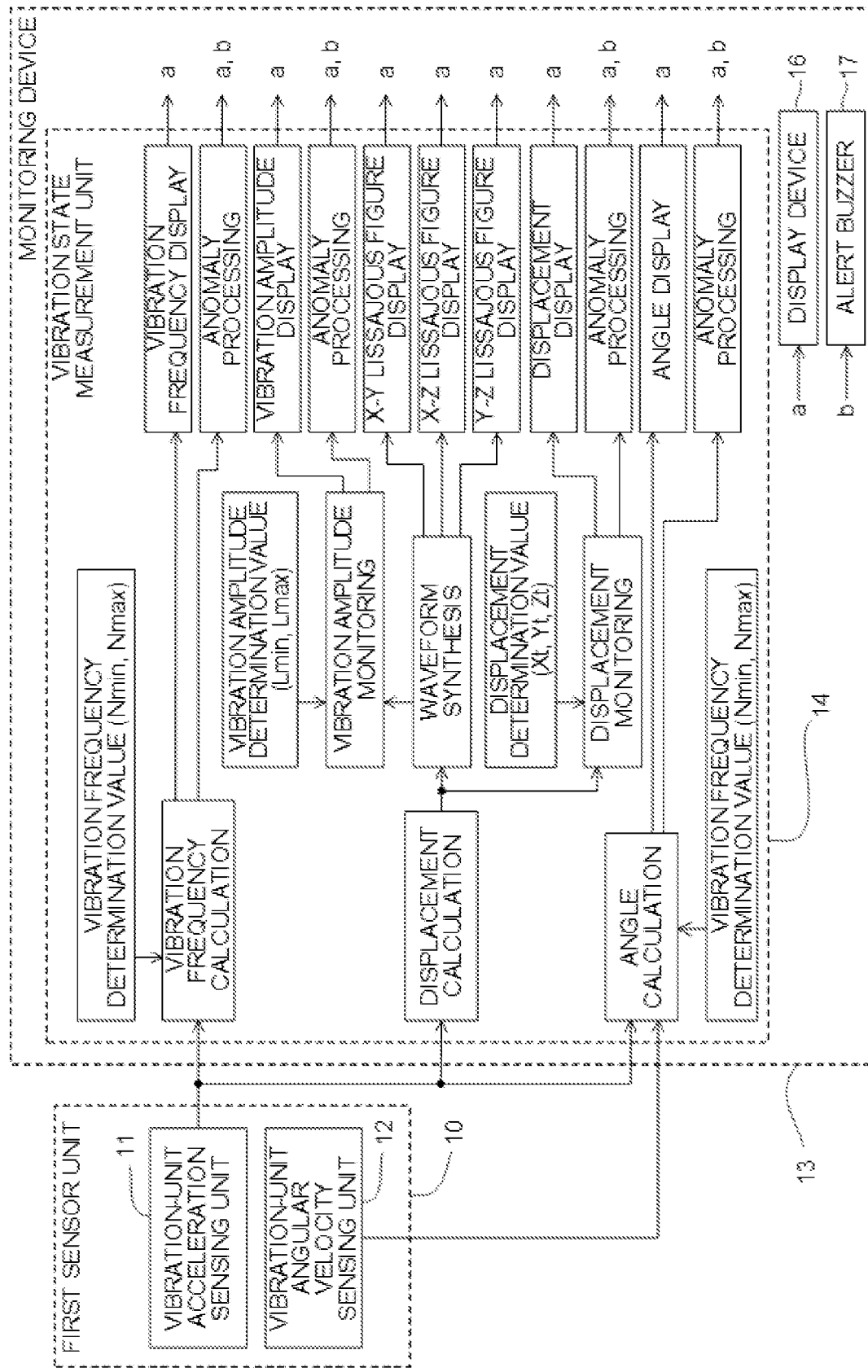
FIG. 17 is a diagram exemplarily illustrating the correspondence relation between an acceleration signal determination result and an anomaly cause in the third embodiment of the present invention.

FIG. 17 lists a vibration-state anomaly, an anomaly cause corresponding to the anomaly, and a handling method of the anomaly cause.

For example, in the anomaly determination A, when a vibration frequency based on acceleration signals in the X direction, which are acquired by the first acceleration sensing units A1 and A3 is favorable (GO) but a vibration frequency based on acceleration signals in the Y direction, which are acquired by the second acceleration sensing units A2 and A4 is anomalous (NG), or when the vibration state is anomalous in both directions, the display device 16 displays anomaly causes such as "unbalance between upper and lower weights of a vibration motor", "vibration frequency difference between two motors", and "degradation of a rubber spring", and also displays handling methods such as "inspection of the vibration frequency of the vibration motor" and "inspection of the rubber spring".

In the anomaly determination A, when the vibration state in the X direction, which is sensed by the first acceleration sensing units A1 and A3 is anomalous (NG) but the vibration state in the Y direction, which is sensed by the second acceleration sensing units A2 and A4 is favorable (GO), the display device 16 displays an anomaly cause such as "degradation of a rubber spring", and also displays a handling method such as "inspection of the rubber spring".

In the anomaly determination D for the high frequency band, when at least one of an overall value based on acceleration signals in the X direction, which are acquired by the first acceleration sensing units A1 and A3, and an overall value based on acceleration signals in the Y direction, which are acquired by the second acceleration sensing units A2 and A4 is anomalous (NG), the display device 16 displays an anomaly cause such as "bearing abrasion", and also displays a handling method such as "bearing inspection and grease lubrication".

Note that the correspondence relation between a vibration-state anomaly and an anomaly cause in FIG. 17 is merely exemplary. The determination method and the handling method differ depending on, for example, use and installation environment of the sieving device, and thus are set as appropriate.

Other Modifications

The present invention is not limited to the above-described embodiments. For example, the present invention includes those described below.

In the first embodiment, the vibration state measurement unit measures all of the vibration angle, displacement, vibration frequency, and vibration amplitude of the vibration unit and displays them on the monitoring device, but may measure and display only some of them.

Vibration of the vibration unit in one direction (the X direction) in plan view occurs in a direction in which vibration should occurs, and thus does not cause a serious problem. However, too large vibration in directions (the Y and Z directions) orthogonal to this direction causes granular substance scattering, machine failure, or the like, and thus the vibration state measurement unit may measure only the displacement in the Y and Z directions and omit measurement of the displacement in the X direction.

To prevent spill of granular substances on the sieve frame, the tilt angle in the X-Z plane and the tilt angle in the Y-Z plane need to be carefully monitored. Thus, only appropriate tilt angles in the X-Z and Y-Z planes may be set as angle determination values, and the angle determination values may be compared with a measured tilt angle in the X-Z plane and a measured tilt angle in the Y-Z plane.

In a sieving device in which two vibration electric motors 7 rotate in directions opposite to each other and unbalance weights inside are synchronized to cause vibration of the vibration unit in one direction (the X direction) in plan view, for example, malfunction of synchronization of the two vibration electric motors can be swiftly found by monitoring at least the displacement in the Y direction, in particular.

In the second embodiment, the vibration state measurement unit measures the installation angle and displacement of the mount and displays them on the monitoring device but may measure and display only one of them.

In the second embodiment, the vibration state measurement unit measures the installation angle and displacement of the mount and displays them on the monitoring device, but similarly to measurement by the vibration unit, the vibration state measurement unit may measure at least one of the vibration frequency and the vibration amplitude. In this case, the vibration frequency and the vibration amplitude can be monitored, and for example, conveyance of vibration of the vibration unit due to damage on the rubber springs or the like can be swiftly found.

In the present embodiments, the vibration state is measured after the vibration unit starts reciprocate motion, but the present invention is not limited thereto, and the first sensor unit, the second sensor unit, and the monitoring device 13 may be actuated to measure the vibration state even when reciprocate motion is not performed. In this case, the postures of the vibration unit and the mount when the vibration unit is at rest can be measured.

In the present embodiments, the first sensor unit is attached to the sieve frame of the vibration unit 4, but the present invention is not limited thereto. The first sensor unit may be attached to any vibrating part.

In the present embodiment, the monitoring device is attached to the cover of the sieving device, but the present invention is not limited thereto, and the monitoring device may be provided at a separate position without being directly attached to the sieving device. A sieving device including such a monitoring device is included as the sieving device of the present invention.

In the present embodiments, the installation angle of the mount is displayed as a level as illustrated in FIG. 9, but the present invention is not limited thereto, and the installation angle may be displayed as a numerical value, similarly to the displacement illustrated in FIG. 8. For example, in the screen illustrated in FIG. 8, display same as that of "vibration angle" in FIG. 5 may be provided as "installation angle" beside "displacement (p-p)".

The installation angle of the mount may be set as an angle determination value to the vibration state measurement unit, and the angle determination value may be compared with the installation angle measured by the vibration state measurement unit. In this case, when the measured installation angle is within the angle determination value, display such as "normal" may be performed on the screen of the display device, similarly to the displacement illustrated in FIG. 8. In addition, similarly to the displacement, when the measured installation angle is beyond the angle determination value, anomaly processing may be performed and the alert buzzer may be actuated, and also, the character display on the display device may be changed from "normal" to, for example, "anomalous".

In the present embodiments, measurement of the vibration unit and the mount is performed while the vibration unit of the sieving device is operating, but the present invention is not limited thereto, and the measurement may be performed while operation of the vibration unit is stopping. In this case, it is possible to monitor the state of an installed posture right after installation and before operation, and a posture at operation stopping, as well as, for example, vibration transfer from another sieving device adjacently operating.

In the present embodiments, the vibration-unit acceleration sensing unit and the vibration-unit angular velocity sensing unit are provided to detect the vibration state of the vibration unit, but the present invention is not limited thereto. Only the vibration-unit acceleration sensing unit may be provided. In this case, the angular velocity cannot be sensed and the vibration angle cannot be measured, but simple measurement can be performed, which leads to cost reduction.

In the third embodiment, the first acceleration sensing units A1 and A3 configured to sense acceleration in the X direction in which the vibration unit 4 performs reciprocating vibration, and the second acceleration sensing units A2 and A4 configured to sense acceleration in the Y direction orthogonal to the X direction are provided. A vibration direction that is important for determination of whether the vibration electric motors M1 and M2 are vibrating at appropriate vibration frequencies is the X direction, and thus the second acceleration sensing units A2 and A4 may be omitted.

Bearings of the two vibration electric motors M1 and M2 have substantially same degradation tendencies, and thus, when only bearing degradation is monitored, an acceleration sensing unit may be provided at a middle position between the two vibration electric motors M1 and M2 or may be provided only to one of the vibration electric motors, thereby simultaneously performing maintenance of the two bearings. To monitor anomaly at each of the vibration electric motors, an acceleration sensing unit needs to be provided to each of the two vibration electric motors M1 and M2.

In the third embodiment, each acceleration sensing unit is a sensor configured to sense acceleration in one axial direction, but the present invention is not limited thereto. A sensor capable of sensing acceleration in two axial directions may be used. In this case, acceleration in the X and Y axial directions is measured. When such a sensor is used, it is possible to omit work of installing sensing units at two places on each vibration electric motor.

In the third embodiment, the vibration frequency is measured and determined, but the vibration frequency may be measured and displayed on the display device. In this manner, it is possible to easily recognize whether the vibration unit and the vibration electric motors are operating at set vibration frequencies.

In the third embodiment, the vibration unit and the vibration electric motors are monitored, but only one of them may be monitored.

Each technological matter in any of the embodiments may be applied as an example to another embodiment.

REFERENCE SIGNS LIST 1 sieving device
2 mount
3 sieve frame
4 vibration unit
5 pillar
6 rubber spring
7 vibration electric motor
107 casing
8 supply tube
9 collection device
10 first sensor unit
110, 111 acceleration sensing unit
11 vibration-unit acceleration sensing unit
12 vibration-unit angular velocity sensing unit
13 monitoring device
14 vibration state measurement unit
113 vibration monitoring device
114 signal processing unit 16 display device
17 alert buzzer
18 second sensor unit
19 mount acceleration sensing unit
20 mount angular velocity sensing unit
30 cover

The invention claimed is:

1. A sieving device comprising:
a mount;
a vibration unit configured to perform reciprocating vibration relative to the mount in one direction in plan view and including a sieve frame;
a first sensor unit, in the vibration unit, including a vibration-unit acceleration sensing unit capable of sensing acceleration of at least the vibration unit; and
a vibration state measurement unit configured to measure a vibration state of the vibration unit based on the acceleration of the vibration unit, which is sensed by the first sensor unit, wherein
the mount includes a second sensor unit including a mount acceleration sensing unit and a mount angular velocity sensing unit, the mount acceleration sensing unit being capable of sensing acceleration of the mount, the mount angular velocity sensing unit being capable of sensing angular velocity of the mount, and
the vibration state measurement unit measures a vibration state of the mount based on the acceleration and the angular velocity of the mount, which are sensed by the second sensor unit.

2. The sieving device according to claim 1, wherein
the first sensor unit includes a vibration-unit angular velocity sensing unit capable of sensing angular velocity of the vibration unit, and
the vibration state measurement unit measures the vibration state of the vibration unit based on the angular velocity of the vibration unit, which is sensed by the first sensor unit.

3. The sieving device according to claim 2, wherein the vibration state measured by the vibration state measurement unit is a vibration angle.

4. The sieving device according to claim 1, wherein the vibration state measured by the vibration state measurement unit is displacement.

5. The sieving device according to claim 4, wherein the vibration state measurement unit is capable of measuring displacement at least in a direction orthogonal to the one direction in which the vibration unit performs reciprocating vibration, based on the acceleration sensed by the vibration-unit acceleration sensing unit.

6. The sieving device according to claim 1, wherein the vibration state of the vibration unit measured by the vibration state measurement unit is a vibration frequency in the one direction.

7. The sieving device according to claim 1, further comprising a display device configured to display the vibration state measured by the vibration state measurement unit.

8. A sieving device comprising:
a mount;
a vibration unit configured to perform reciprocating vibration relative to the mount in one direction in plan view and including a sieve frame;
a vibration electric motor configured to generate the reciprocating vibration of the vibration unit by rotating a rotor inside a casing;
an acceleration sensing unit provided to the casing of the vibration electric motor and capable of sensing acceleration of the vibration electric motor in a radial direction of rotation of the rotor;
a vibration monitoring device configured to monitor the vibration electric motor by measuring a vibration state of the vibration electric motor based on the acceleration of the vibration electric motor, which is sensed by the acceleration sensing unit;
a first sensor unit, in the vibration unit, including a vibration-unit acceleration sensing unit capable of sensing acceleration of at least the vibration unit; and
a vibration state measurement unit configured to measure a vibration state of the vibration unit based on the acceleration of the vibration unit, which is sensed by the first sensor unit, wherein
the mount includes a second sensor unit including a mount acceleration sensing unit and a mount angular velocity sensing unit, the mount acceleration sensing unit being capable of sensing acceleration of the mount, the mount angular velocity sensing unit being capable of sensing angular velocity of the mount, and
the vibration state measurement unit measures a vibration state of the mount based on the acceleration and the angular velocity of the mount, which are sensed by the second sensor unit.

9. The sieving device according to claim 8, wherein the acceleration sensing unit includes a first acceleration sensing unit configured to sense acceleration at least in a direction parallel to the one direction in which the vibration unit performs reciprocating vibration, in plan view.

10. The sieving device according to claim 8, wherein the acceleration sensing unit includes a second acceleration sensing unit configured to sense acceleration at least in a direction orthogonal to the one direction in which the vibration unit performs reciprocating vibration, in plan view.

11. The sieving device according to claim 8, wherein the acceleration sensing unit includes
a first acceleration sensing unit configured to sense acceleration in a direction parallel to the one direction in which the vibration unit performs reciprocating vibration, in plan view, and
a second acceleration sensing unit configured to sense acceleration in a direction orthogonal to the one direction in which the vibration unit performs reciprocating vibration, in plan view.

12. The sieving device according to claim 11, wherein vibration electric motors are provided on respective sides of a central axis of the vibration unit in the one direction, and a first acceleration sensing unit and a second acceleration sensing unit are provided to each of the vibration electric motors.

13. The sieving device according to claim 8, wherein the vibration monitoring device displays an anomaly cause and handling method of the anomaly cause on a display device when a measured value is beyond a predetermined threshold value.

* * * * *